(12) United States Patent
Van Druten et al.

(10) Patent No.: US 12,158,197 B2
(45) Date of Patent: Dec. 3, 2024

(54) TRANSMISSION SYSTEM FOR A VEHICLE

(71) Applicant: Punch Powertrain PSA e-transmissions NV, Sint-Truiden (BE)

(72) Inventors: Roell Marie Van Druten, Eindhoven (NL); Antonius Van Deurzen, Boekel (NL)

(73) Assignee: Punch Powertrain PSA e-transmissions NV, Sint-Truiden (BE)

( * ) Notice: Subject to any disclaimer, the term of this patent is extended or adjusted under 35 U.S.C. 154(b) by 95 days.

(21) Appl. No.: 17/783,727

(22) PCT Filed: Dec. 10, 2020

(86) PCT No.: PCT/EP2020/085521
§ 371 (c)(1),
(2) Date: Jun. 9, 2022

(87) PCT Pub. No.: WO2021/116283
PCT Pub. Date: Jun. 17, 2021

(65) Prior Publication Data
US 2023/0023057 A1    Jan. 26, 2023

(30) Foreign Application Priority Data

Dec. 11, 2019    (BE) .................................. 2019/5889

(51) Int. Cl.
*F16H 3/00* (2006.01)
*B60K 6/365* (2007.10)
(Continued)

(52) U.S. Cl.
CPC ............. *F16H 3/006* (2013.01); *B60K 6/365* (2013.01); *B60K 6/547* (2013.01);
(Continued)

(58) Field of Classification Search
CPC ... F16H 3/006; F16H 2003/0826; F16H 3/089
(Continued)

(56) References Cited

U.S. PATENT DOCUMENTS

| 4,404,869 A | 9/1983 | Numazawa et al. |
| 6,755,089 B2 * | 6/2004 | Hirt .......................... F16H 3/006 74/335 |

(Continued)

FOREIGN PATENT DOCUMENTS

| CN | 106195190 A | 12/2016 |
| DE | 102009020550 A1 | 11/2010 |

(Continued)

OTHER PUBLICATIONS

International Search Report and Written Opinion—PCT/EP2020/085521—mailing date Jan. 26, 2021.

*Primary Examiner* — Sherry L Estremsky
(74) *Attorney, Agent, or Firm* — Banner & Witcoff, LTD

(57) ABSTRACT

A transmission system for a vehicle, in particular a front wheel driven vehicle, having an input arranged for connection to a drive source, and an output arranged for connection to a load. The transmission system comprises a transmission which in turn comprises an output shaft connected to the output, a first input shaft and a first speed transforming gear coupling the first input shaft to the output shaft, and a second input shaft and a second speed transforming gear coupling the second input shaft to the output shaft.

11 Claims, 18 Drawing Sheets

(51) Int. Cl.
 *B60K 6/547* (2007.10)
 *F16H 37/08* (2006.01)
 *F16H 3/08* (2006.01)
 *F16H 37/04* (2006.01)

(52) U.S. Cl.
 CPC . *F16H 37/0833* (2013.01); *F16H 2003/0826* (2013.01); *F16H 2037/047* (2013.01)

(58) Field of Classification Search
 USPC .......................................................... 74/340
 See application file for complete search history.

(56) References Cited

U.S. PATENT DOCUMENTS

| | | | | |
|---|---|---|---|---|
| 7,305,900 | B2 * | 12/2007 | Suzuki | F16H 61/688 |
| | | | | 74/340 |
| 7,597,020 | B2 * | 10/2009 | Baldwin | B60W 10/113 |
| | | | | 74/330 |
| 8,899,122 | B2 * | 12/2014 | Van Druten | F16H 3/126 |
| | | | | 74/331 |
| 2005/0115344 | A1 * | 6/2005 | Kim | F16H 3/006 |
| | | | | 74/331 |

FOREIGN PATENT DOCUMENTS

| | | | | |
|---|---|---|---|---|
| DE | 102010008101 | A1 * | 8/2011 | ............. F16H 3/006 |
| EP | 1260733 | A2 | 11/2002 | |
| EP | 2853431 | A2 | 4/2015 | |
| EP | 3446556 | A1 | 2/2019 | |
| FR | 3075117 | A1 | 6/2019 | |
| NL | 2018735 | B1 | 10/2018 | |
| WO | WO-2011155820 | A1 * | 12/2011 | ............. F16D 21/06 |
| WO | WO-2012112028 | A2 * | 8/2012 | ................ F16H 3/00 |

* cited by examiner

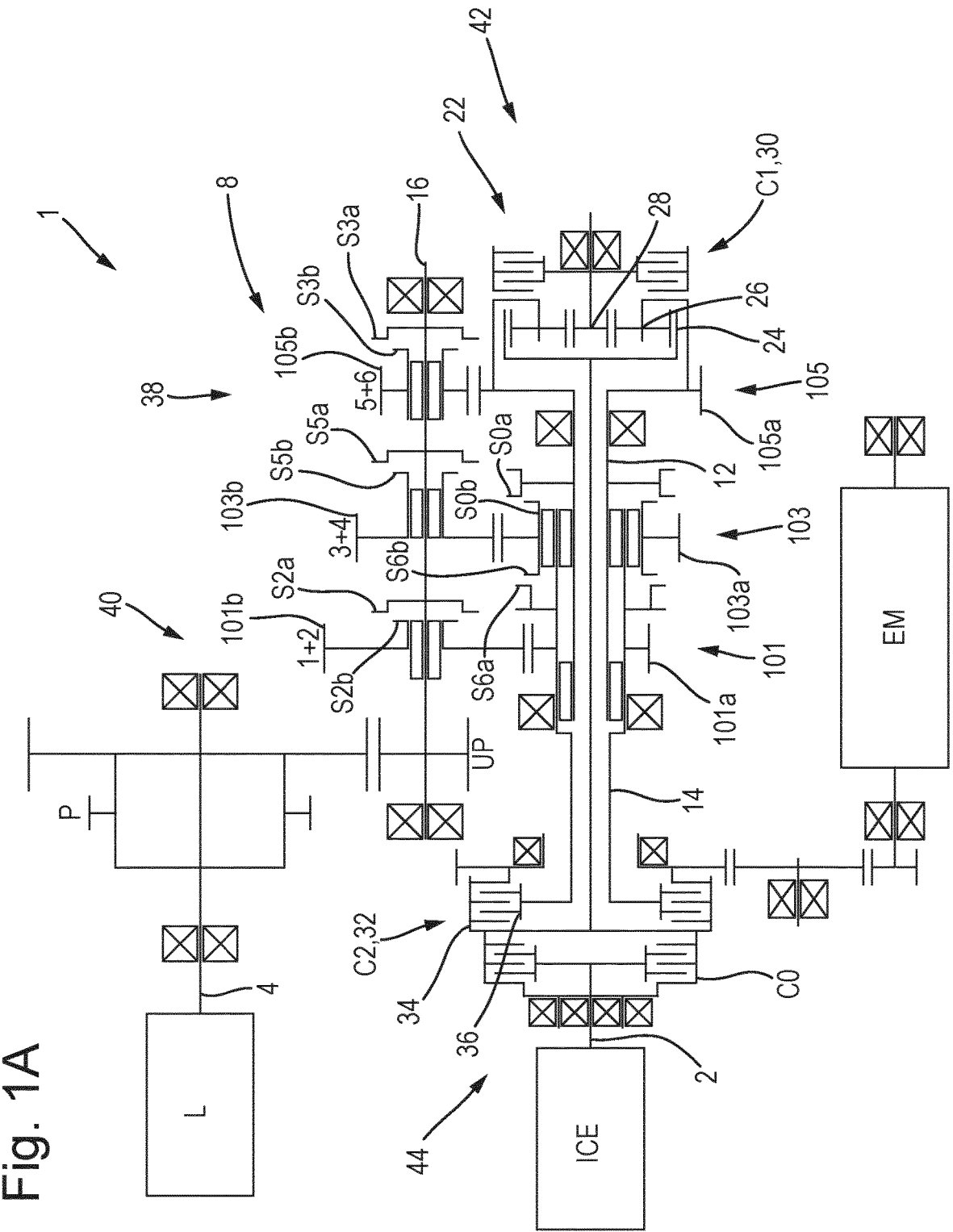

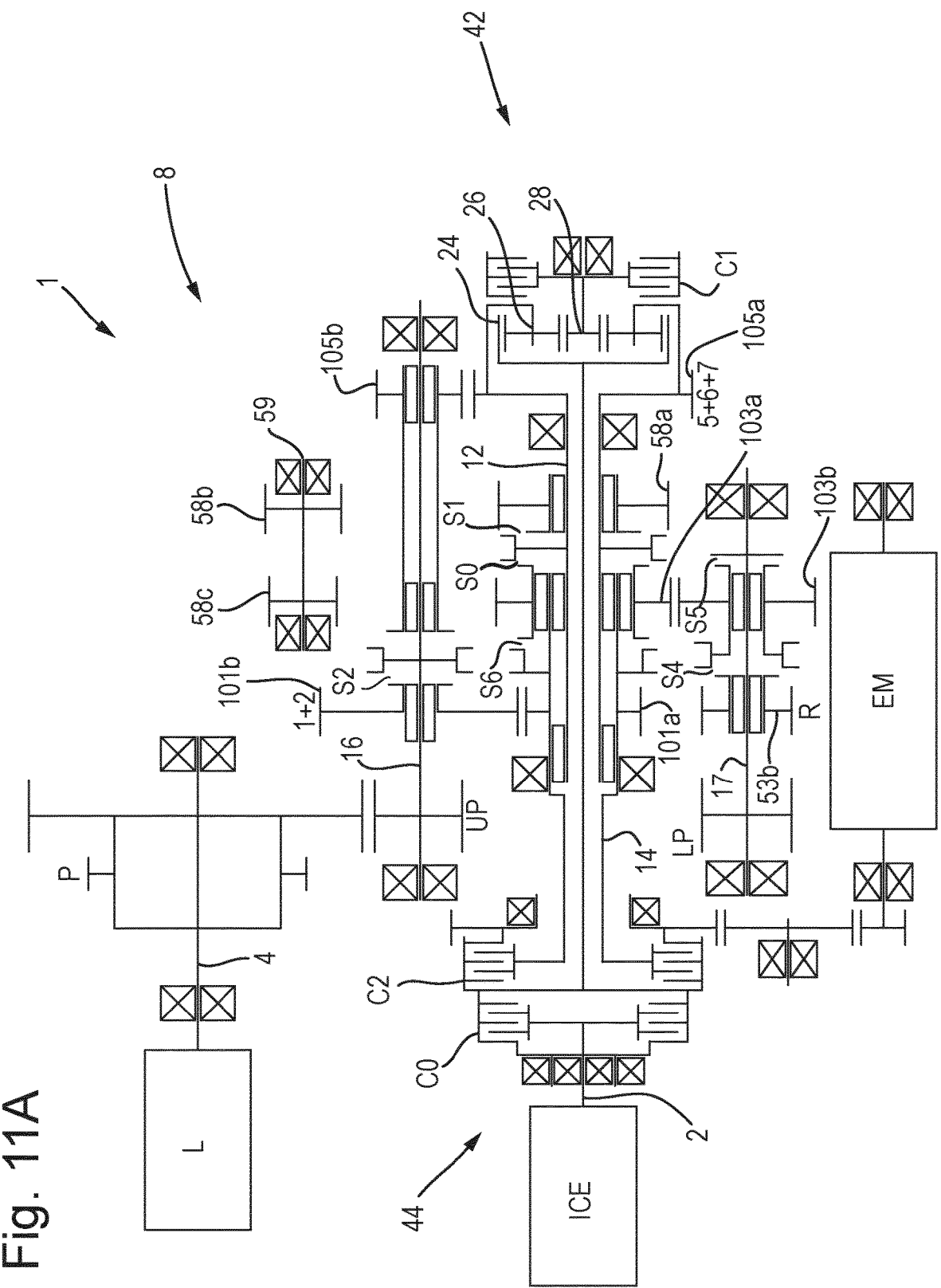

TRANSMISSION SYSTEM FOR A VEHICLE

CROSS-REFERENCE TO RELATED APPLICATIONS

This application is a U.S. National Stage application under 35 U.S.C. § 371 of International Application PCT/EP2020/085521 (published as WO 2021/116283 A1), filed Dec. 10, 2020, which claims the benefit of priority to Application BE 2019/5889, filed Dec. 11, 2019. Benefit of the filing date of these prior applications is hereby claimed. Each of these prior applications is hereby incorporated by reference in its entirety.

FIELD OF THE INVENTION

The invention relates to a transmission system for a vehicle having an input arranged for connection to a drive source, and an output arranged for connection to a load.

BACKGROUND OF THE INVENTION

Transmission systems, such as automatic transmission systems for vehicles are known. Such transmission systems generally have an input arranged for connection to a drive source, such an internal combustion engine, and an output arranged for connection to a load, such as a drive train of the vehicle. One type of transmission system includes a transmission comprising a first input shaft, a first output shaft connected to the output, and a first speed transforming gear between the first input shaft and the first output shaft, and a second input shaft, a second output shaft connected to the output, and a second speed transforming gear between the second input shaft and the second output shaft. Hence, different gears, such as first gear, second gear, third gear, etc. can be associated with the first input shaft or the second input shaft, and can be individually selected.

WO2018/192965A1 describes a transmission system including a first coupling member having a first section which is connected to the input, and a second section which is connected to the first input shaft of the transmission; a second coupling member having a third section which is connected to the input and a fourth section which is connected to the second input shaft of the transmission; and a further coupling member having a fifth section which is connected to the first input shaft and a sixth section which is connected to the second input shaft for directly coupling the first and the second input shaft to each other.

SUMMARY OF THE INVENTION

It is an object to provide a transmission system which is more cost-effective than the known transmission system. Alternatively, or additionally, it is an object to provide a transmission system allowing smooth shifting through successive gears. Alternatively, or additionally, it is an object to provide a transmission system that is flexible in the selection of transmission gears. More in general it is an object to provide an improved, or at least alternative, transmission system.

According to an aspect is provided a transmission system for a vehicle, in particular a front wheel driven vehicle, having an input arranged for connection to a drive source, such as an internal combustion engine and/or electric motor, and an output arranged for connection to a load, such as a drive train of the vehicle. The transmission system comprises a transmission which in turn comprises an output shaft connected to the output, a first input shaft and a first speed transforming gear coupling the first input shaft to the output shaft, and a second input shaft and a second speed transforming gear coupling the second input shaft to the output shaft.

Herein the term speed transforming gear is used to denote a combination, e.g. a pair, of gear wheels transforming a rotational speed at a respective input shaft into a (lower, equal or higher) rotational speed at the output shaft. The transmission system allows the vehicle to be operated in different gears, such as reverse gear, first gear, second gear, third gear, fourth gear, fifth gear, etc. Each speed transforming gear is associated with one or more transmission gears. Herein a transmission gear denotes a combination, e.g. pair, or gear wheels causing the transmission to operate in a predetermined gear. E.g. a first transmission gear causes the transmission to operate in first gear, a second transmission gear causes the transmission to operate in a second gear, etc. It will be appreciated that it is possible that different transmission gears share one or more gear wheels. For example a first/second transmission gear denotes a combination, e.g. pair, of gear wheels causing the transmission to operate in first or second gear, e.g. depending on settings of coupling members of the transmission system.

According to this aspect, the transmission system further comprises a first coupling member including a first friction element, the first coupling member having a first section which is connected to the input, and a second section which is connected to the first input shaft of the transmission, and a second coupling member including a second friction element, the second coupling member having a third section which is connected to the input, and a fourth section which is connected to the second input shaft of the transmission. The transmission system comprises a third coupling member including a third friction element, the third coupling member having a fifth section which is connected to the first input shaft and a sixth section which is connected to a transmission gear of the transmission, and a fourth coupling member including a fourth friction element, the fourth coupling member having a seventh section which is connected to the second input shaft and an eighth section which is connected to said transmission gear of the transmission. This way, the number of idling gear wheels in the transmission system when operating each of the transmission gears, is minimized to reduce inertia and friction losses. Also, this allows input gear wheels of other transmission gears to be connected to the first or second input shaft without the need for additional coupling members and/or bearings as first and second input shafts can be connected to each other by means of the third and fourth coupling members via said transmission gear.

Optionally, the transmission comprises only one output shaft. This yields a particular compact setup, with low complexity.

Optionally, the first and second speed transforming gears together include a set of transmission gears, each transmission gear, except a reverse transmission gear, including an input gear wheel and an output gear wheel, wherein the input gear wheel of each transmission gear is connected or connectable to the first or second input shaft, and wherein the output gear wheel of each transmission gear is connected or connectable the only one output shaft.

Optionally, the sixth section of the third coupling member and the eighth section of the fourth coupling member are connected to a third/fourth transmission gear or a third/fourth/fifth transmission gear. This way, the first input shaft and the second input shaft can be connected to each other to via the third/fourth or third/fourth/fifth transmission gear. This allows input gear wheels of other transmission gears to be connected to the first or second input shaft without the need for additional coupling members and/or bearings. For example, an input gear wheel of a first/second transmission gear may be connected to the second input shaft. The first/second transmission gear can be connected to the first input shaft by means of the third and fourth coupling members via the third/fourth transmission gear. Similarly, an input gear wheel of a fifth/sixth or fifth/sixth/seventh transmission gear may be connected to the second input shaft, and can be connected to the first input shaft by means of the third and fourth coupling members via the third/fourth transmission gear.

Optionally, the sixth section of the third coupling member and the eighth section of the fourth coupling are directly connected to a gear wheel of the first or second speed transforming gears.

Optionally, the sixth section of the third coupling member and the eighth section of the fourth coupling are directly connected to a gear wheel of the third/fourth transmission gear.

Optionally, the sixth section of the third coupling member and the eighth section of the fourth coupling are directly connected to an input gear wheel of the third/fourth transmission gear.

Optionally, the first and/or second speed transforming gears are axially positioned between the first friction element, and the second friction element.

Optionally, the first friction element is arranged at a first end of the transmission and/or the second friction element is arranged at a second, opposite, end of the transmission, e.g. at a side of the drive source.

Optionally, the first and/or second coupling member includes, e.g. is, a planetary gear set comprising at least three rotational members and a friction brake. The at least three rotational members can include a sun gear, a planet carrier and a ring gear.

Optionally, the first and/or second coupling member includes, e.g. is, a planetary gear set comprising at least four rotational members and two friction brakes. The first section of the first coupling member can be associated with a first rotational member of the planetary gear set. The second section of the first coupling member can be associated with a second rotational member of the planetary gear set. A third rotational member of the planetary gear set can be associated with the first friction element, such as a first friction brake. A fourth rotational member of the planetary gear set can be associated with the further friction element, such as a further friction brake.

Optionally, a rotational member of the planetary gear set is directly connected to a gear wheel of the first or second speed transforming gears.

Optionally, the first and/or second and/or third and/or fourth coupling member includes a friction clutch, such as a wet or dry plate friction clutch.

Optionally, the third coupling member comprises a third synchronizer, e.g. including a form closed coupling such as a dog clutch and/or keyed coupling.

Optionally, the fourth coupling member comprises a fourth synchronizer, e.g. including a form closed coupling such as a dog clutch and/or keyed coupling.

Optionally, the first speed transforming gear includes a second, fourth and sixth transmission gear.

Optionally, the first speed transforming gear includes an eighth transmission gear.

Optionally, the second speed transforming gear includes a first, third and fifth transmission gear.

Optionally, the second speed transforming gear includes an seventh transmission gear.

Optionally, the first speed transforming gear includes a reverse transmission gear.

Optionally, the transmission is free from a reverse transmission gear.

According to an aspect of the invention is provided, a transmission system for a front wheel driven vehicle having an input arranged for connection to a drive source, and an output arranged for connection to a load. The transmission system comprises a transmission which in turn comprises an output shaft connected to the output, a first input shaft and a first speed transforming gear coupling the first input shaft to the output shaft, and a second input shaft and a second speed transforming gear coupling the second input shaft to the output shaft. The first and second speed transforming gears together include a set of transmission gears, each including an input gear wheel and an output gear wheel, wherein the input gear wheel is connected or connectable to the first or second input shaft, and the output gear wheel is connected or connectable the output shaft. The first and second speed transforming gears also include a linking gear including a first linking gear wheel which is connected or connectable to the first input shaft or the second input shaft, and a second linking gear wheel which is connected or connectable to the output shaft. The first linking gear wheel meshes with the second linking gear wheel, wherein the second linking gear wheel is rotationally coupled to an output gear wheel of one of the transmission gears.

Optionally, the second linking gear wheel and the output gear wheel of the one of the transmission gears are both mounted on a common linking shaft.

Optionally, a rotational axis of the linking shaft coincides with a rotational axis of the output shaft. This allows for compact construction, and limiting the number of components.

Optionally, the second linking gear wheel is rotationally coupled to an output gear wheel of the a third/fourth transmission gear.

Optionally, the transmission comprises only one output shaft.

According to an aspect of the invention is provided a transmission system for a front wheel driven vehicle having an input arranged for connection to a drive source, and an output arranged for connection to a load. The transmission system comprises a transmission which in turn comprises an output shaft connected to the output, a first input shaft and a first speed transforming gear coupling the first input shaft to the output shaft, and a second input shaft and a second speed transforming gear coupling the second input shaft to the output shaft. The first and second speed transforming gears include a set of transmission gears comprising a third/fourth transmission gear.

Optionally, the set of transmission gears further comprises a first/second transmission gear.

Optionally, the set of transmission gears further comprises a fifth/sixth or a fifth/sixth/seventh transmission gear.

Optionally, the transmission comprises only one output shaft.

Optionally, each transmission gear includes an input gear wheel and an output gear wheel, wherein the input gear wheel of each transmission gear is connected or connectable to the first or second input shaft, and wherein the output gear wheel of each transmission gear is connected or connectable the only one output shaft.

According to an aspect of the invention is provided a transmission system for a front wheel driven vehicle having an input arranged for connection to a drive source, and an output arranged for connection to a load. The transmission system comprises a transmission comprising which in turn comprises an output shaft connected to the output, a first input shaft and a first speed transforming gear coupling the first input shaft to the output shaft, and a second input shaft and a second speed transforming gear coupling the second input shaft to the output shaft. The first and second speed transforming gears include a set of transmission gears comprising a third/fourth/fifth transmission gear.

Optionally, the set of transmission gears further comprises first/second transmission gear.

Optionally, the set of transmission gears further comprises sixth/seventh/eight transmission gear.

Optionally, the transmission comprises only one output shaft.

Optionally, each transmission gear includes an input gear wheel and an output gear wheel, wherein the input gear wheel of each transmission gear is connected or connectable to the first or second input shaft, and wherein the output gear wheel of each transmission gear is connected or connectable the only one output shaft.

According to an aspect is provided a vehicle comprising a transmission system according to any of the preceding claims.

It will be appreciated that any one or more of the above aspects, features and options can be combined. It will be appreciated that any one of the options described in view of one of the aspects can be applied equally to any of the other aspects. It will also be clear that all aspects, features and options described in view of the transmission system apply equally to the vehicle.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawings:

FIG. 1A shows a schematic representation of a transmission system for a vehicle;

FIG. 11A shows a schematic representation of a transmission system; and

DETAILED DESCRIPTION

Figure 1B:
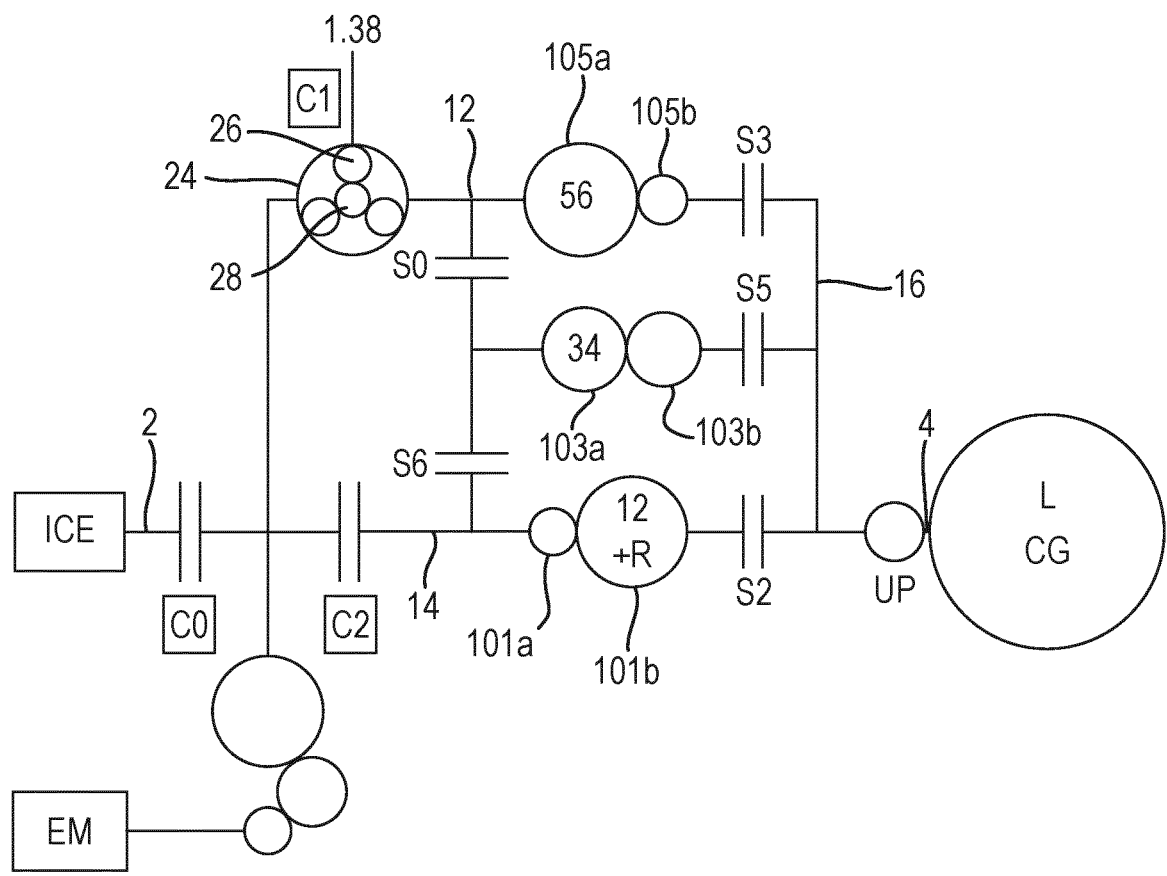
FIG. 1B shows a functional representation of the transmission system of FIG. 1A.

FIG. 1A shows a schematic representation of a transmission system 1 for a vehicle. FIG. 1B shows a functional representation of the transmission system 1 of FIG. 1A. The transmission system 1 comprises an input 2. The input 2 is connected to a drive source, which in this case is an internal combustion engine ICE and/or an electromotor EM. The transmission system 1 also comprises an output 4. The output 4 is connected to a load L, which load is for example the wheels and/or drive train of the vehicle. The load L can be e.g. connected to the output 4 by means of a differential gear.

In this example, the transmission system 1 includes an initial coupling member C0. The initial coupling member C0 includes a friction element, here a friction clutch. The initial coupling member C0 is included in the input 2 of the transmission system. The initial coupling member C0 connects the input 2 to the second coupling member C2. The initial coupling member C0 enables selectively coupling of the transmission to the drive source, e.g. the internal combustion engine ICE. In this example, the electromotor EM or electric generator cannot de decoupled by the initial coupling member C0. The initial coupling member C0 may be omitted for a cost effective and compact setup. The initial coupling member C0 may be omitted in the transmission systems shown in other figures.

The transmission system 1 includes a transmission 8, here a 6-speed transmission. The transmission 8 has a first input shaft 12 and a second input shaft 14. The transmission has a single output shaft 16 which is connected to the output 4. This allows for a compact build of the transmission system 1, and makes the transmission system 1 less complex.

The transmission system 1 further includes a first coupling member C1 and a second coupling member C2. In this example, the first coupling member C1 includes a planetary gear set 22, having three rotational members 24, 26, 28. The first rotational member 24, which here is formed by a ring gear, is connected to the input 2. The second rotational member 26, which here is formed by a planet carrier, is connected to the first input shaft 12. The third rotational member 28, which here is formed by a sun gear, is connected to a first friction element 30. The first friction element 30 here is a friction brake, such as a wet or dry plate friction brake, which e.g. is normally open.

The transmission ratio between the first and the second rotational members 24 and 26 is found between a value of one and two, retarding toward the output, when the third rotational member 28 is braked. In this example, the transmission ratios of the planetary gear set 22 and the transmission 8 are selected such that the lowest forward gear of the transmission system 1 can be attained by closing the brake.

In this example, the second coupling member C2 includes a second friction element 32. Here the second coupling member 20 is formed by a friction clutch. The clutch comprises a first section 34 which is connected to the input 2, and a second section 36 which is connected to the second input shaft 14. Here the clutch is a wet or dry plate friction clutch which is normally closed by means of spring force. The second coupling member C2 may be arranged for actuation via an axial thrust bearing.

Thus, the first coupling member C1 selectively couples the input 2 to the first input shaft 12. If the first coupling member C1 couples the input 2 to the first input shaft 12, the first coupling member C1 couples the input 2 to the first input shaft 12 while changing, here reducing, rotational speed. Here, the rotational speed of the first input shaft 12 is reduced by a factor between one and two relative to a rotational speed of the input 2. The factor can e.g. be between 1.2 and 1.7, preferably between 1.3 and 1.5. The second coupling member C2 here is a direct coupling, selectively coupling the input 2 to the second input shaft 14 while maintaining rotational speed if coupled. More in general, the first coupling member C1 couples the input 2 to the first input shaft 12 at a first speed ratio, and the second coupling member C2 couples the input 2 to the second input shaft 14 at a second speed ratio, wherein the first and second speed ratios differ.

A first speed transforming gear 38 connects the first input shaft 12 and the output shaft 16. A second speed transforming gear 40 connects the second input shaft 14 and the output shaft 16.

In the transmission system 1, the first and second speed transforming gears together include a set of transmission gears. Each transmission gear, except a reverse transmission gear, includes an input gear wheel and an output gear wheel, wherein the input gear wheel of each transmission gear is connected or connectable to the first 12 or second 14 input shaft, and wherein the output gear wheel of each transmission gear is connected or connectable the output shaft 16.

The transmission system 1 further includes a third coupling member S0, including a third friction element, here a friction clutch. Here, the third coupling member S0 comprises a third synchronizer. The synchronizer can e.g. including a form closed coupling such as a dog clutch and/or keyed coupling. This can also apply to further synchronizers discussed below. The third coupling member S0 has a fifth section S0a which is connected to the first input shaft 12 and a sixth section S0b which is connected to a transmission gear of the transmission. In this example, the sixth section S0b is connected to a third/fourth transmission gear 103. In particular, the sixth section S0b is connected to an input gear wheel 103a of the third/fourth transmission gear.

The transmission system 1 further includes a fourth coupling member S6, including a fourth friction element, here a friction clutch. Here, the fourth coupling member S6 comprises a fourth synchronizer. The fourth coupling member S6 has a seventh section S6a which is connected to the first second shaft 14 and a eighth section S6b which is connected to a transmission gear of the transmission. In this example, the eighth section S6b is connected to a third/fourth transmission gear 103. In particular, the eighth section S6b is connected to an input gear wheel 103a of the third/fourth transmission gear.

Here, the third coupling member S0 selectively couples the first input shaft 12 to the output shaft 16 via the third/fourth transmission gear 103 for allowing the transmission to operate in third gear. The fourth coupling member S6 selectively couples the second input shaft 14 to the output shaft 16 via the third/fourth transmission gear 103 for allowing the transmission to operate in fourth gear.

Further, the third coupling member S0 and the fourth coupling member S6 together selectively couple the first input shaft 12 to the second input shaft 14, when the third coupling member S0 couples the first input shaft 12 to the third/fourth transmission gear 103 and the fourth coupling member S6 couples the second input shaft 14 to the third/fourth transmission gear 103.

This allows for an efficient transmission system 1, as the number of idling gear wheels in the transmission is minimized.

The transmission system 1 further includes a fifth coupling member S2, here including a fifth synchronizer friction element, here a friction clutch. The fifth coupling member S2 has a ninth section S2a which is connected to the output shaft 16 and a tenth section S2b which is connected to a transmission gear of the transmission. In this example, the tenth section S2b is connected to a first/second transmission gear 101. In particular, the tenth section S2b is connected to an output gear wheel 101b of the first/second transmission gear 101.

The speed transforming gears may be selected such that the first/second transmission gear 101 forms the first gear if the third rotational member 28 of the planetary gear set 22 is braked, i.e. the first coupling member C1 is closed, and the third, fourth and fifth coupling members S0, S6, S2 are closed to couple the first input shaft 12 to the output shaft 16 via the first/second transmission gear 101. Here, forming the first gear involves coupling the first input shaft 12 to the second input shaft 14 via third/fourth transmission gear. The third/fourth transmission gear idles, i.e. the sixth coupling member S5 is open.

The speed transforming gears may be selected such that the first/second transmission gear 101 forms the second gear if the second and the fifth coupling members C2, S2 are closed to couple the second input shaft 12 to the output shaft 16 via the first/second transmission gear 101. Here, an input gear wheel of the first/second transmission gear 101a is fixedly connected to the second input shaft 14, but an additional coupling member may be provided for selectively coupling the input gear wheel 101a to the second input shaft 14. Forming the second gear does not require idling of other transmission gears, such as the third/fourth and fifth/sixth transmission gears.

The transmission system 1 further includes a sixth coupling member S5, here including a sixth friction element sixth synchronizer, here a friction clutch. The sixth coupling member S5 has an eleventh section S5a which is connected to the output shaft 16 and a twelfth section S5b which is connected to a transmission gear of the transmission. In this example, the twelfth section S5b is connected to the third/fourth transmission gear 103. In particular, the twelfth section S5b is connected to an output gear wheel 103b of the third/fourth transmission gear 103.

The speed transforming gears may be selected such that the third/fourth transmission gear 103 forms the third gear if the third rotational member 28 of the planetary gear set 22 is braked, i.e. the first coupling members C1 is closed, and the third and sixth coupling members S0, S5 are closed to couple the first input shaft 12 to the output shaft 16 via the third/fourth transmission gear 103.

The speed transforming gears may be selected such that the third/fourth transmission gear 103 forms the fourth gear if the second, fourth and the sixth coupling members C2, S6 and S5 are closed to couple the second input shaft 12 to the output shaft 16 via the third/fourth transmission gear 103.

The transmission system 1 further includes a seventh coupling member S3, here including a seventh friction element seventh synchronizer, here a friction clutch. The seventh coupling member S3 has an thirteenth section S3a which is connected to the output shaft 16 and a fourteenth section S3b which is connected to a transmission gear of the transmission. In this example, the fourteenth section S3b is connected to the fifth/sixth transmission gear 105. In particular, the fourteenth section S3b is connected to an output gear wheel 105b of the fifth/sixth transmission gear 105.

The speed transforming gears may be selected such that the fifth/sixth transmission gear 105 forms the fifth gear if the third rotational member 28 of the planetary gear set 22 is braked, i.e. the first coupling members C1 is closed, and the seventh coupling member S3 is closed to couple the first input shaft 12 to the output shaft 16 via the fifth/sixth transmission gear 105.

The speed transforming gears may be selected such that the fifth/sixth transmission gear 105 forms the sixth gear if the second, fourth, third and seventh coupling members C2, S6, S0 and S3 are closed to couple the second input shaft 12 to the output shaft 16 via the fifth/sixth transmission gear 105.

A reverse speed transforming gear may be formed, e.g. with the first transmission gear, by reversing the rotational direction of the input with respect to forward speed transforming gears. For example, the electromotor EM may be arranged to reverse a direction of the input.

As can be seen in FIG. 1, the first coupling member C1 is positioned at a first end 42 of the transmission system 1. The second coupling member C2 is positioned at a second, opposite, end 44 of the transmission system 1. Here the second end 44 is positioned at a side of the drive source. Here the first and second speed transforming gears 38, 40 are positioned axially between the first coupling member C1 and the second coupling member C2. More in general, the first and second speed transforming gears 38, 40 are positioned axially between the first friction element and the second friction element. This allows for a compact build of the transmission system.

The transmission gears are arranged such that successive shifting through respective first, second, third, fourth, fifth and sixth gears is effected by alternatingly engaging the first coupling member C1 and the second coupling member C2.

Figure 2:
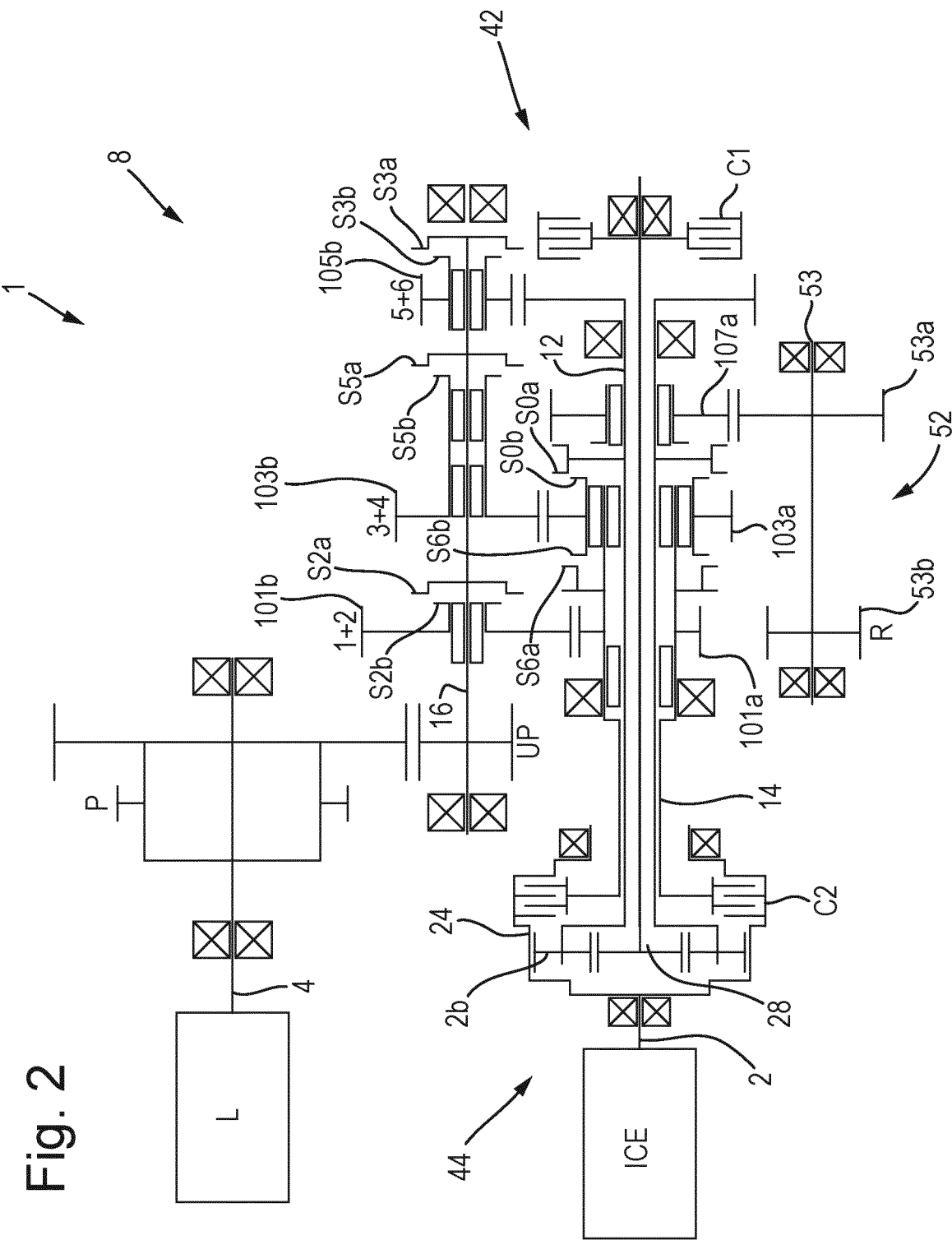
FIG. 2 shows a schematic representation of a transmission system.

FIG. 2 shows a schematic representation of a transmission system 1. The transmission system 1 shown in FIG. 2 differs from the transmission system as shown in FIG. 1A in that a reverse transmission gear 52 is included, wherein the transmission 8 is operated in reverse gear by connecting the first or second input shaft 12, 14 to the output shaft 16 via the reverse transmission gear 52. The reverse transmission gear 107 includes an input reverse gear wheel 107a connected or connectable to the first or second input shaft 12,14. Here the input reverse gear wheel 107a is connectable to the first input shaft 12.

The reverse transmission gear 52 further includes an intermediate shaft 53, here including a first and second intermediate gear wheel 53a, 53b which intermediate gear wheels 53a, 53b are mounted and rotationally fixed coupled to each other on the intermediate shaft 53. The intermediate shaft 53 reverses the rotational direction of the first or second input shaft 12, 14. The input reverse gear wheel 107a meshes with the first intermediate gear wheel 53a. The second intermediate gear wheel 53b meshes with an output gear wheel of another transmission gear. Here the second intermediate gear wheel 53b meshes the output gear wheel 101b the first/second transmission 101.

In this example, the transmission is operated in reverse gear if the third rotational member 28 of the planetary gear set 22 is braked, the input reverse gear wheel 107a is coupled to the first input shaft 12, and the fifth coupling member S2 is closed. I other words, the transmission is operated in reverse gear via the reverse gear 52 and the first gear.

The transmission system 1 as shown in FIG. 2 also differs from the transmission system shown in FIG. 1 in that the planetary gear set 22 is provided on an the second end 44 in stead of the first end 44. This allows for a compact setup, in particular for a transmission including an additional intermediate shaft 53.

Figure 3:
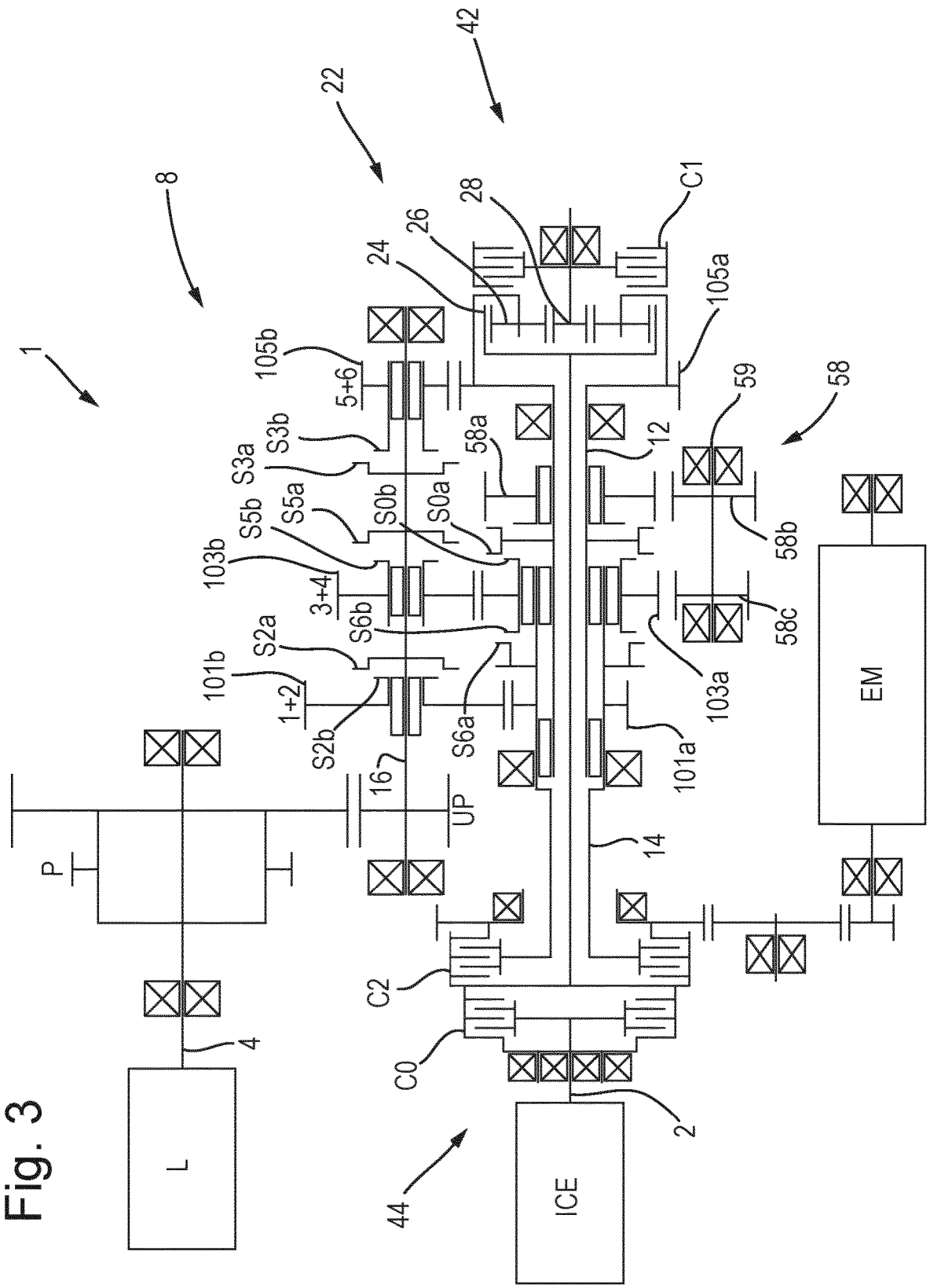
FIG. 3 shows a schematic representation of a transmission system 1 for a vehicle.

FIG. 3 shows a schematic representation of a transmission system 1 for a vehicle, in particular for a front wheel driven vehicle. The transmission system 1 shown in FIG. 3 differs from the transmission system shown in FIG. 1A in that the transmission 8 includes a linking gear 58, sometimes referred to as a "hop over". The linking gear enables the transmission 8 to operate in at least seven gears plus an optional reverse gear. The linking gear 58 includes a separate linking shaft 59 extending at least substantially parallel to the first input shaft 12. The linking gear includes a first linking gear wheel 58a which is connected or connectable to the first input shaft 12 or the second input shaft 14, and a second linking gear wheel 58b which is connected or connectable to the linking shaft 59. The first linking gear wheel 58a meshes with the second linking gear wheel 58b. The second linking gear wheel 58b is rotationally fixed coupled to a third linking gear wheel 58c. Here the second linking gear wheel 58b and the third linking gear wheel 58c are mounted on common shaft. The third linking wheel 58c meshes with an input gear wheel of a transmission gear. Here, the third linking wheel 59c meshes with the input gear wheel 103a of the third/fourth transmission gear 103.

The transmission system 1 as shown in FIG. 3 includes an eighth coupling member S1, here including an eighth synchronizer. The eighth coupling member S1 has an fifteenth section S1a which is connected to the first input shaft 12 and a sixteenth section S1b which is connected to a transmission gear of the transmission. In this example, the sixteenth section Sib is connected to the input gear wheel 58a of the linking gear 58.

In a compact set up, the third synchronizer of the third coupling member S0 and the eighth synchronizer of the eight coupling member S1 could form a double synchronizer unit. The double synchronizer unit allows selectively engaging the third coupling member S0 or the eight coupling member S1.

In the transmission system shown in FIG. 3, the speed transforming gears may be selected such that the fifth/sixth/ seventh transmission gear 105 forms the seventh gear if the second, fourth, eighth and seventh coupling members C2, S6, S1, S3 are closed to couple the second input shaft 14 to the output shaft 16, via the third/fourth transmission gear 103, the second input shaft 14 and the fifth/sixth/seventh transmission gear 105.

Compared to the transmission system 1 as shown in FIGS. 1A,1B and 2, the linking gear enables the transmission 8 to operate in a first auxiliary gear, wherein the auxiliary first gear is formed via the linking gear. This way, a different transmission ratio, e.g. a larger or smaller transmission ratio, than the first gear can be obtained at least with respect to the first gear of the transmission system as shown in FIGS. 1A,1B and 2.

The speed transforming gears may be selected such that the first/second transmission gear 101 forms an auxiliary first gear if the third rotational member 28 of the planetary gear set 22 is braked, i.e. the first coupling member C1 is closed, and the third, fourth and fifth coupling members S0, S6, S2 are closed to couple the first input shaft 12 to the output shaft 16 via the linking gear, second input shaft 14, and the first/second transmission gear 101.

Optionally, in use of the transmission system 1, one of the first gear, the auxiliary first gear and the second gear is not used. For example, the first gear is skipped when successive shifting through the gears.

Figure 4A:
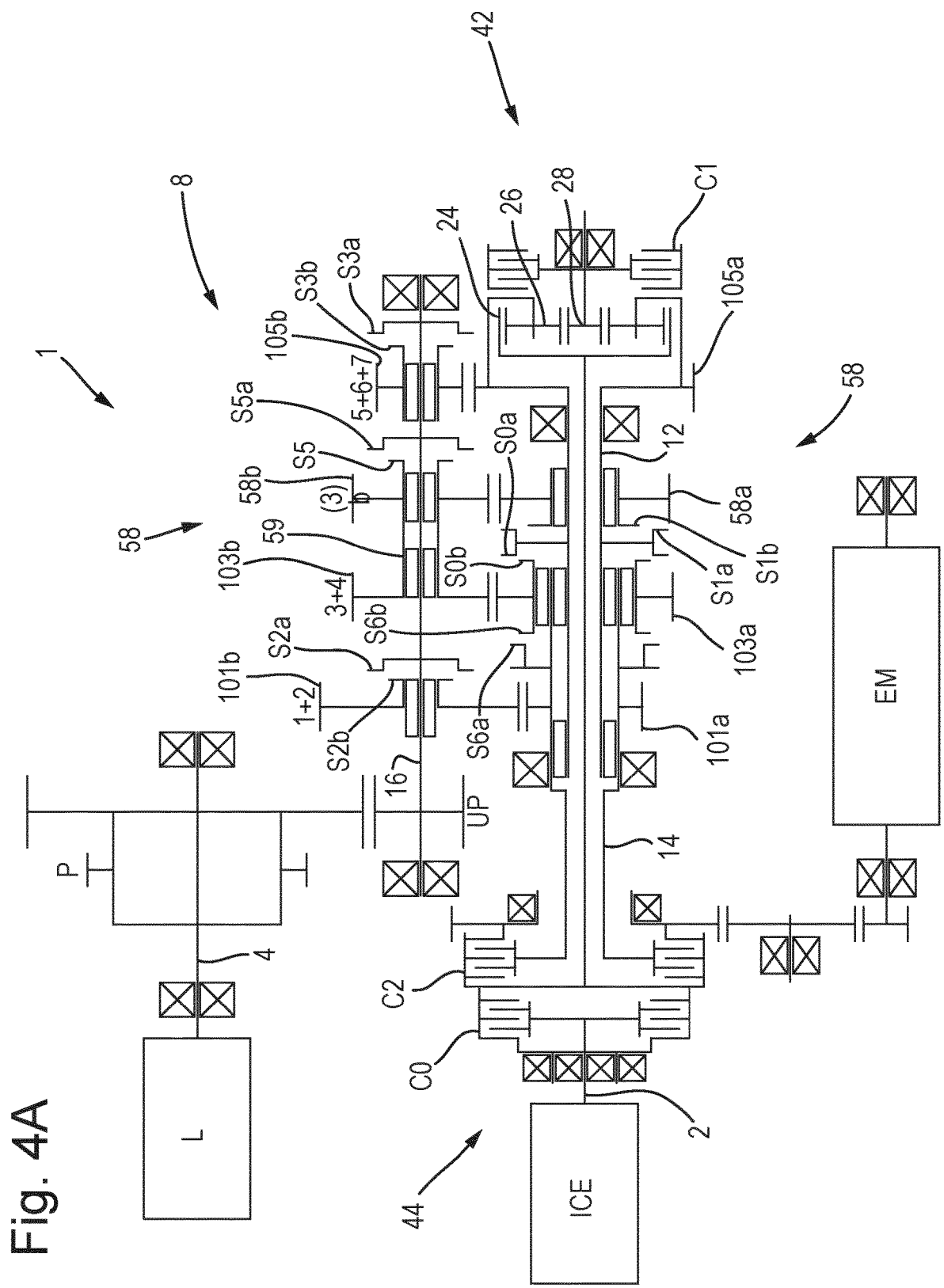
FIG. 4A shows a schematic representation of a transmission system.
Figure 4B:
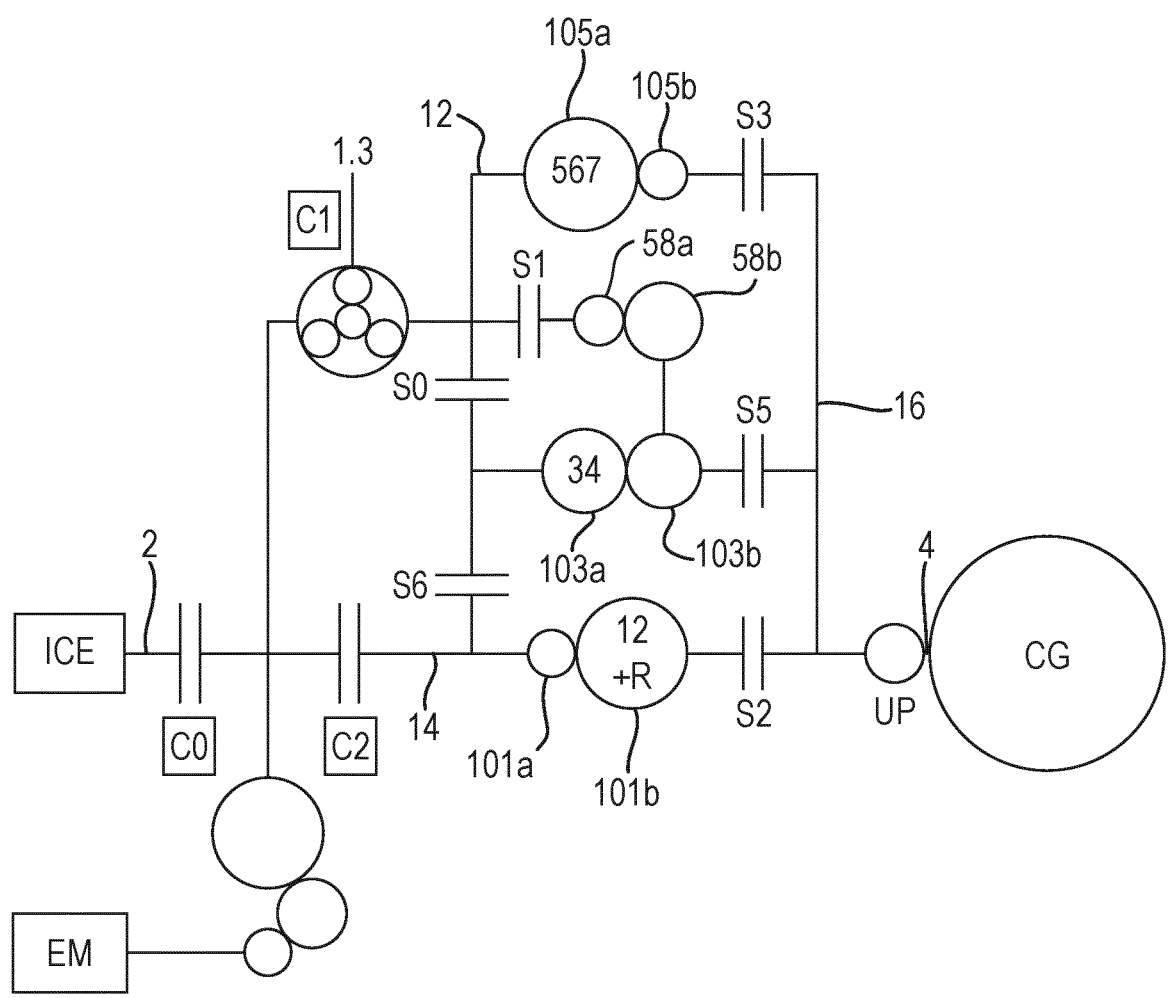
FIG. 4B shows a functional representation of the transmission system of FIG. 4A.

FIG. 4A shows a schematic representation of a transmission system 1 for a vehicle, in particular for a front wheel driven vehicle. FIG. 4B shows a functional representation of the transmission system 1 of FIG. 4A. The transmission system 1 shown in FIG. 4A,4B differs from the transmission system shown in FIG. 1A,1B in that the transmission 8 includes a linking gear 58, sometimes referred to as a "hop over". The transmission system 1 shown in FIG. 4A,4B differs from the transmission system shown in FIG. 3 in that the linking gear 58 is essentially provided on the output shaft such that the linking shaft 59 and the third linking gear wheel 58c as shown in FIG. 3 can be omitted. This yields a particular compact and robust setup. The linking gear enables the transmission 8 to operate in at least seven gears plus an optional reverse gear.

The linking gear includes a first linking gear wheel 58a which is connected or connectable to the first input shaft 12 or the second input shaft 14, and a second linking gear wheel 58b which is connected or connectable to the output shaft. The first linking gear wheel 58a meshes with the second linking gear wheel 58b. The second linking gear wheel 58b is rotationally fixed coupled to an output gear wheel of one of the transmission gears. Here, the second linking gear wheel 58b is rotationally fixed coupled to the output gear wheel 103b of the third/fourth transmission gear 103. With this linking gear, the transmission system 1 can be operated in seven transmission gears plus a reverse transmission gear. As shown in FIG. 4A, 4B the transmission system 1 comprises a fifth/sixth/seventh transmission gear, compared to a fifth/sixth transmission gear as shown in FIG. 1A, 1B. The second linking gear wheel 58b is and the output gear wheel 103b of the third/fourth transmission gear are both mounted on a common linking shaft 58c. A rotational axis of the linking shaft 58c coincides with a rotational axis of the output shaft.

The transmission system 1 as shown in FIG. 4A,4B includes an eighth coupling member S1, here including an eighth synchronizer The eighth coupling member S1 has an fifteenth section S1a which is connected to the first input shaft 12 and a sixteenth section S1b which is connected to a transmission gear of the transmission. In this example, the sixteenth section Sib is connected to the input gear wheel 58a of the linking gear 58.

The speed transforming gears may be selected such that the fifth/sixth/seventh transmission gear 105 forms the seventh gear if the second, fourth, eighth and seventh coupling members C2, S6, S1, S3 are closed to couple the second input shaft 12 to the output shaft 16, via the third/fourth transmission gear 103, the second input shaft 14 and the fifth/sixth/seventh transmission gear 105.

In a compact set up, the third synchronizer of the third coupling member S0 and the eighth synchronizer of the eight coupling member S1 could form a double synchronizer unit. The double synchronizer unit allows selectively engaging the third coupling member S0 or the eight coupling member S1.

A reverse speed transforming gear may be formed, e.g. with the first transmission gear, by reversing the rotational direction of the input with respect to forward speed transforming gears. For example, the electromotor EM may be arranged to reverse a direction of the input.

A reverse speed transforming gear may alternatively be formed, e.g. by means of the linking gear 58. Hereto, an intermediate gear wheel may be provided between the first linking gear wheel 58a and the second linking gear wheel 58b to reverse a direction. Note that this configuration does not allow for the transmission to operate in a seventh gear.

Similar to the transmission system 1 as shown in FIG. 3, the linking gear enables the transmission 8 to operate in a first auxiliary gear, wherein the auxiliary first gear is formed via the linking gear. This way, a different transmission ratio, e.g. a larger transmission ratio, than the first gear can be obtained at least with respect to the first gear of the transmission system as shown in FIGS. 1A,1B and 2.

The speed transforming gears may be selected such that the first/second transmission gear 101 forms an auxiliary first gear if the third rotational member 28 of the planetary gear set 22 is braked, i.e. the first coupling member C1 is closed, and the third, fourth and fifth coupling members S0, S6, S2 are closed to couple the first input shaft 12 to the output shaft 16 via the linking gear, second input shaft 14, and the first/second transmission gear 101.

Optionally, in use of the transmission system 1, one of the first gear, the auxiliary first gear and the second gear is not used. For example, the first gear is skipped when successive shifting through the gears.

Figure 5A:
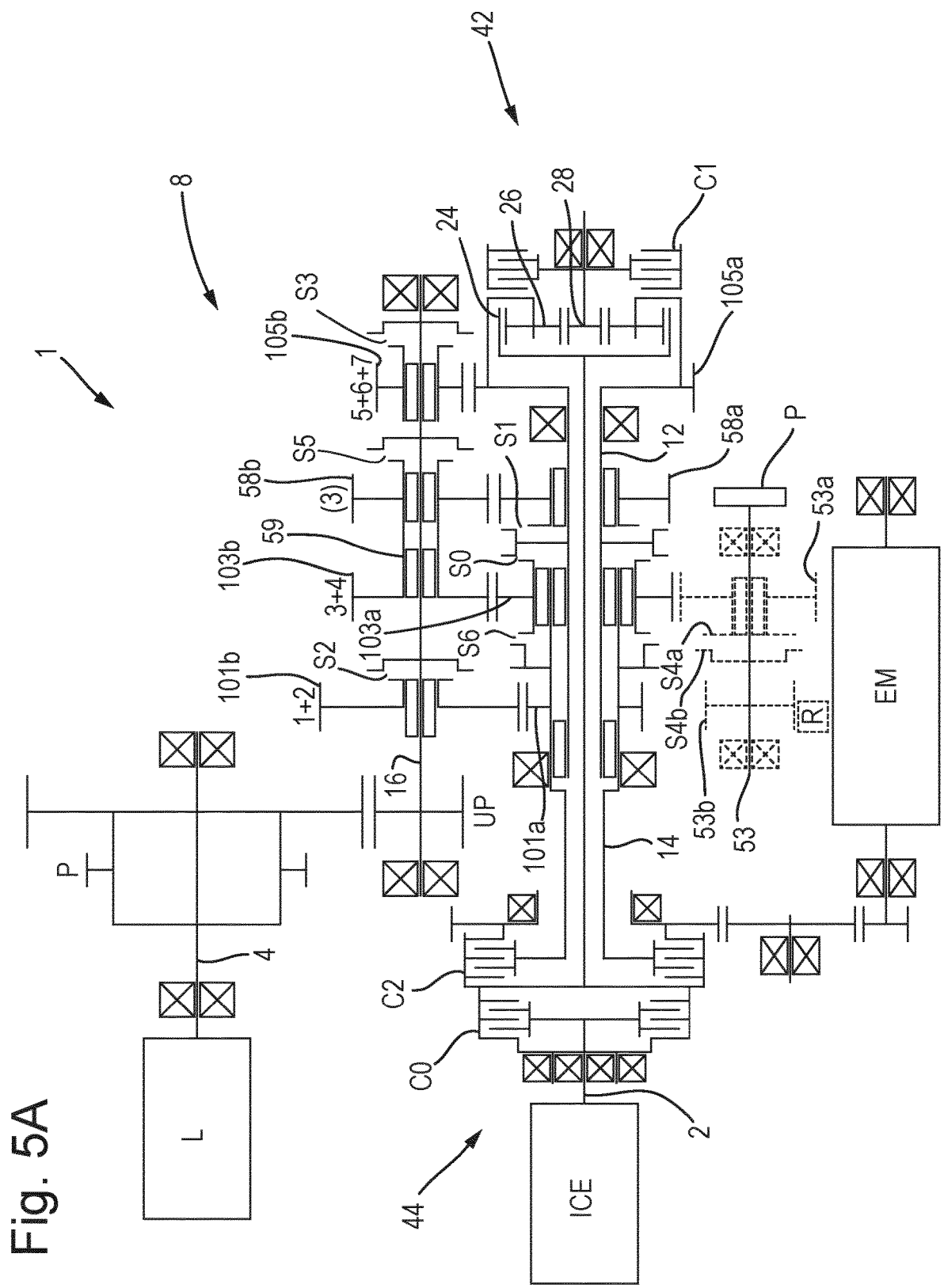
FIG. 5A shows a schematic representation of a transmissions system.
Figure 5B:
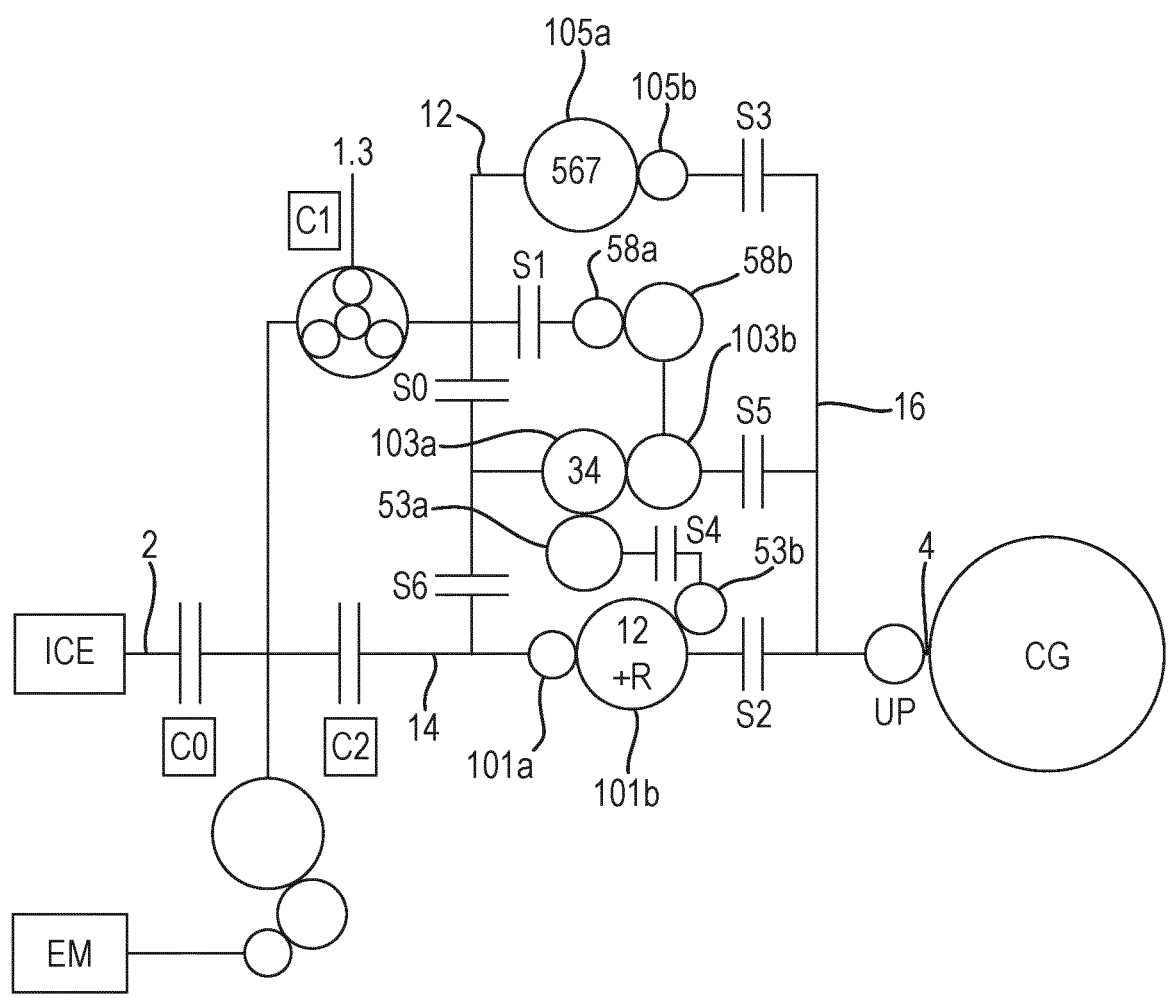
FIG. 5B shows a functional representation of the transmission system of FIG. 5A.

FIG. 5A shows a schematic representation of a transmissions system for a vehicle. FIG. 5B shows a functional representation of the transmission system 1 of FIG. 5A. The transmission system 1 as shown in FIG. 5A,5B differs from the transmission system 1 as shown in FIG. 4A,4B in that a separate reverse transmission gear 52 is included. This allows to operate the transmission 8 in reverse, without having to rely on battery life of e.g. an electromotor. The transmission system 1 is operated in reverse gear by connecting the first or second input shaft 12, 14 to the output shaft 16 via the reverse transmission gear 52. The reverse transmission gear 52 includes an intermediate shaft 53, here including a first intermediate gear wheel 53a and a second intermediate gear wheel 53b which intermediate gear wheels 53a, 53b are mounted and rotationally fixedly couplable to each other on the intermediate shaft 53. The intermediate shaft 53 reverses the rotational direction of the first or second input shaft 12, 14. The first intermediate gear wheel 53a meshes with an input gear wheel of a transmission gear. In this example, the first intermediate gear wheel 53a meshes with the input gear wheel 103a of the third/fourth transmission gear 103. The second intermediate gear wheel 53b meshes with an output gear wheel of another transmission gear. Here the second intermediate gear wheel 53b meshes the output gear wheel 101b the first/second transmission 101.

The transmission system 1 as shown in FIG. 5A,5B includes an ninth coupling member S4, here including a ninth synchronizer. The ninth coupling member S4 has an seventeenth section S4a which is connected to the first intermediate gear wheel 53a and a eighteenth section S4b which is connected to the second intermediate gear wheel 53b.

The transmission is operated in reverse gear if the third rotational member 28 of the planetary gear set 22 is braked, i.e. the first coupling member C1 is closed, and the third, ninth, and the fifth coupling members S0, S4S4, S2 are closed.

Alternatively, the transmission is operated in reverse gear if the third rotational member 28 of the planetary gear set 22 is braked, i.e. the first coupling member C1 is closed, and the eighth, ninth, and the fifth coupling members S1, S4, and S2 are closed.

A dedicated actuation means may be provided for actuating, e.g. engaging and disengaging, the ninth coupling member S4 independently from any other coupling member in the transmission system 1. This minimizes a shifting time between any forward gear and the reverse gear. It also provides for a modular build of the transmission system in which a reverse gear could be offered as an optional add-on feature. For example, in electrically driven vehicles the ninth coupling member S4 may be omitted as such vehicle can be driven in reverse by reversing the rotational direction of the electromotor. The ninth coupling member S4 may for example be hydraulically and/or electromechanically actuated.

In this example, a park brake P is included, and provided on the intermediate shaft 53.

Figure 6:
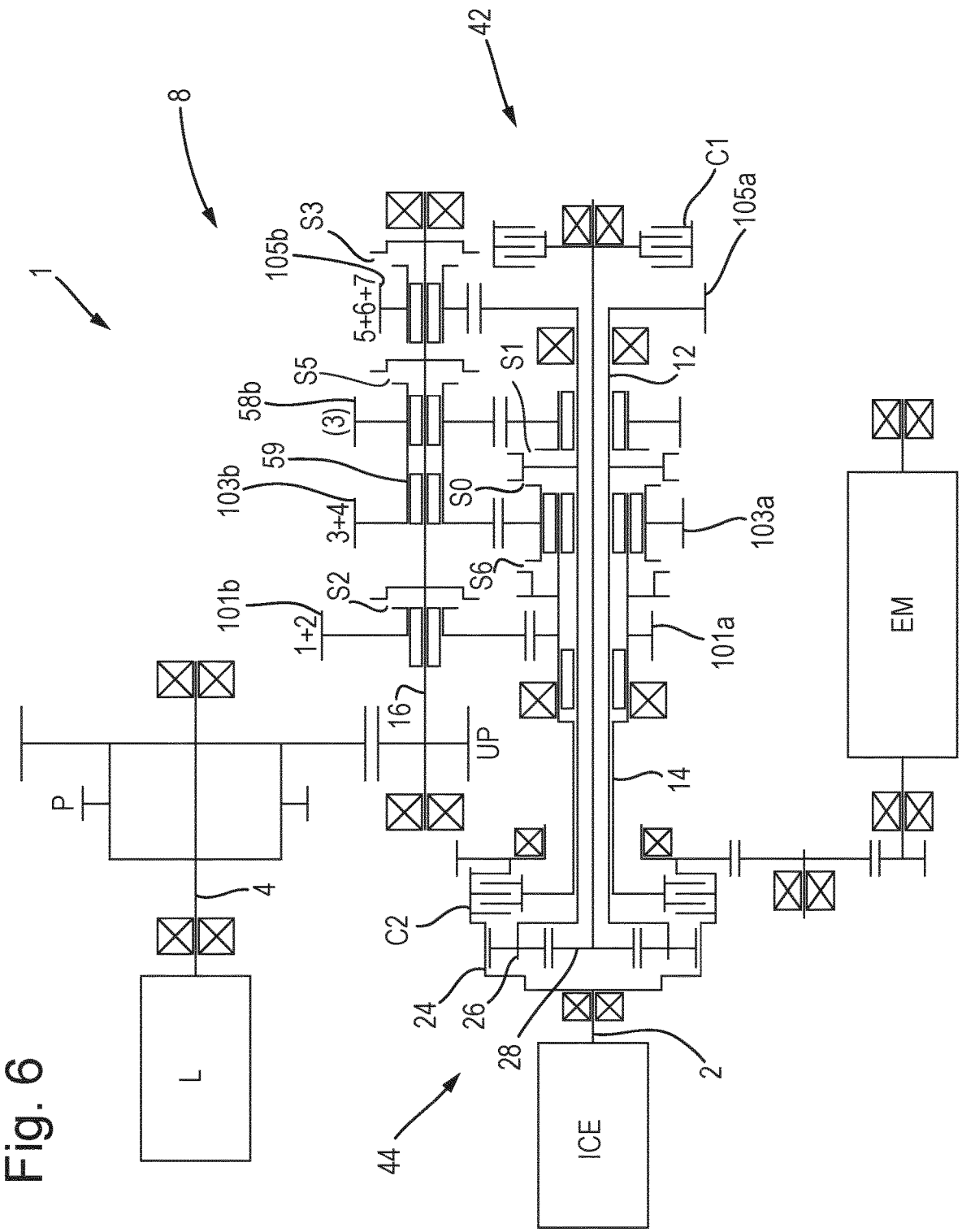
FIG. 6 shows a schematic representation of a transmission system for a vehicle.

FIG. 6 shows a schematic representation of a transmission system 1 for a vehicle. The transmission system 1 shown in FIG. 6 differs from the transmission system as shown in FIG. 5A,5B in that the planetary gear set 22 is provided on the second end 44. A reverse gear is omitted in the transmission system 1, but it may be appreciated it is possible to include a reverse transmission gear.

Figure 7:
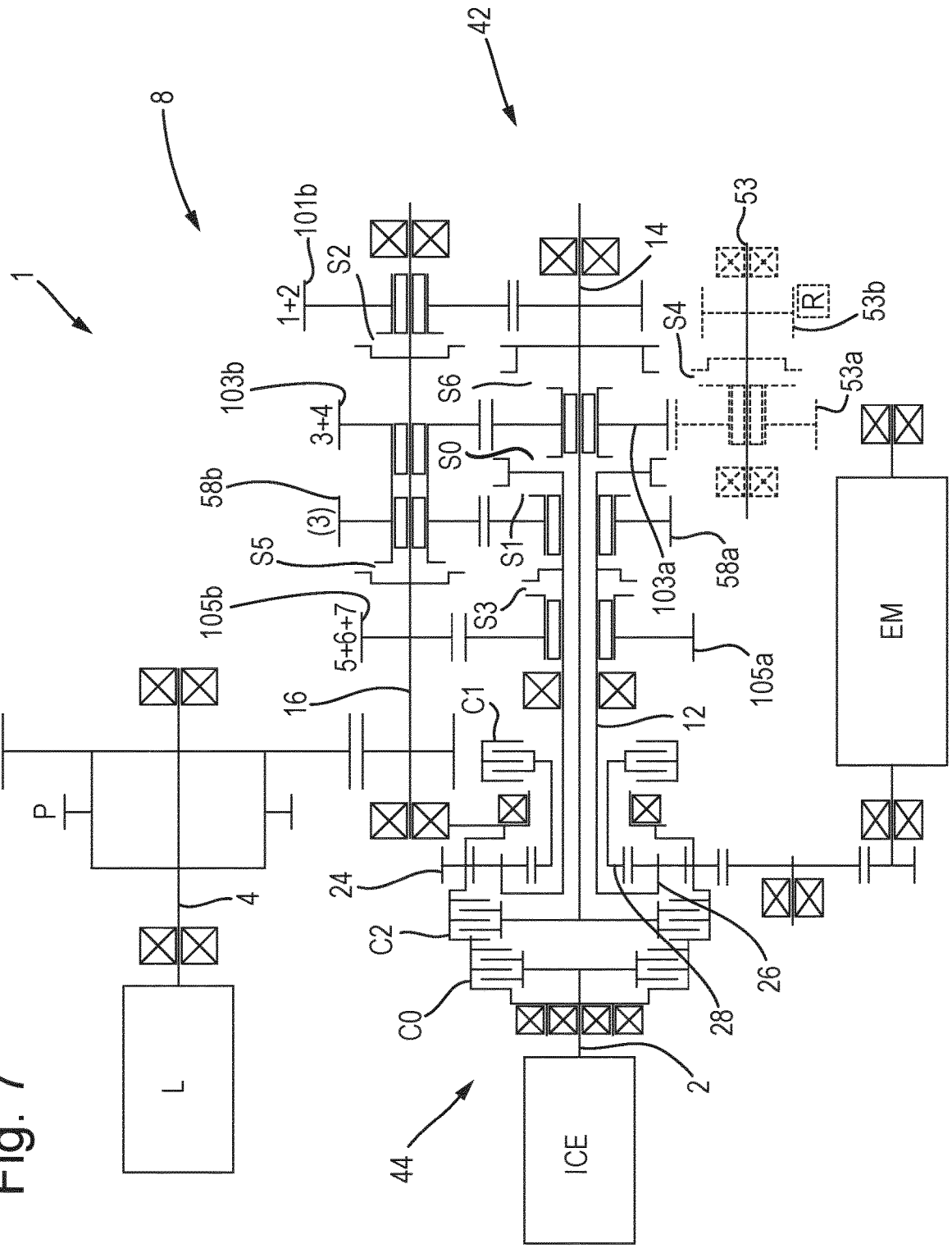
FIG. 7 shows a schematic representation of a transmission system.

FIG. 7 shows a schematic representation of a transmission system 1. The transmission system 1 shown in FIG. 7 differs from the transmission system as shown in FIG. 6 in that the axial order of the transmission gears is reversed.

Figure 8A:
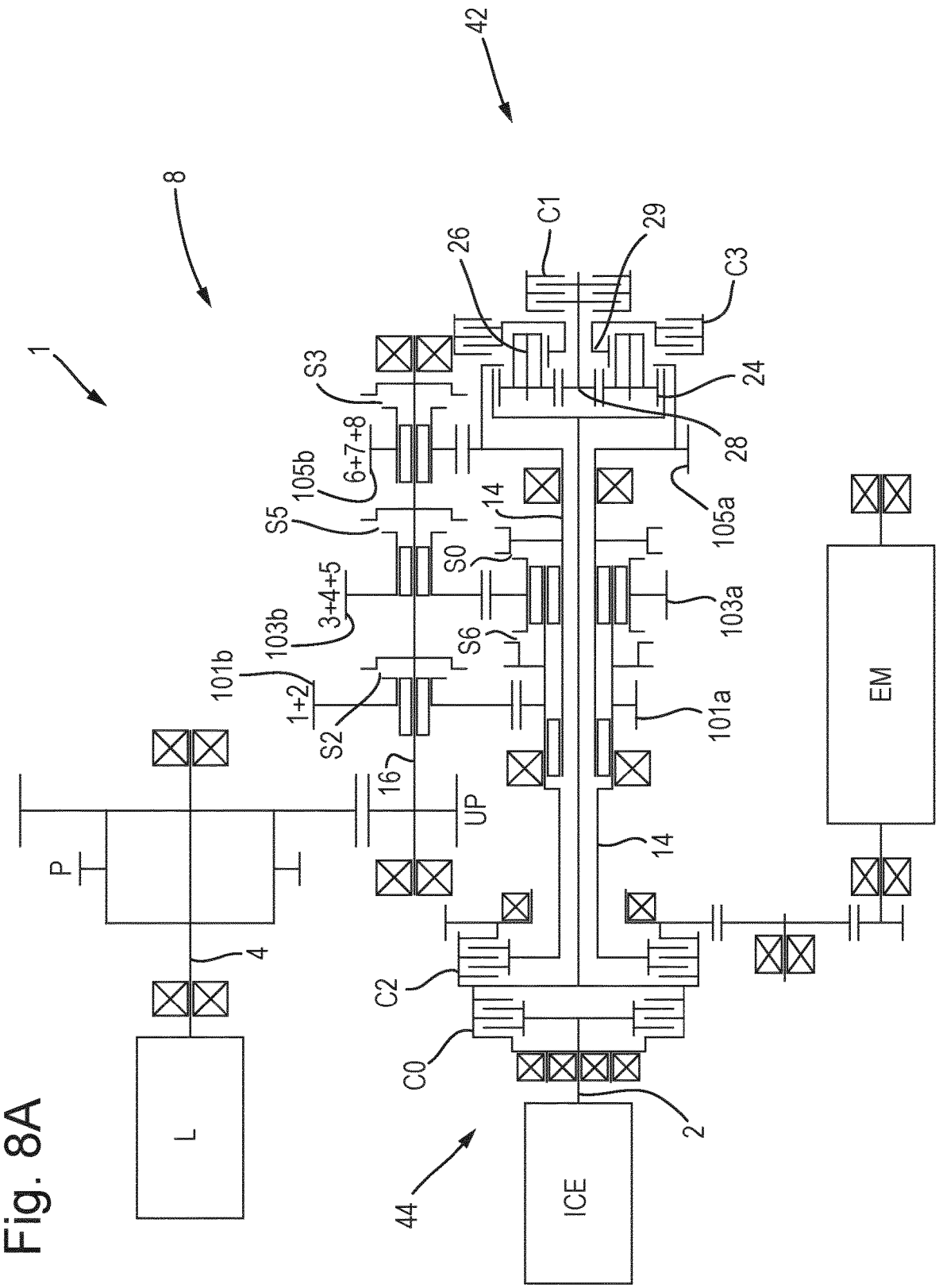
FIG. 8A shows a schematic representation of a transmission system.
Figure 8B:
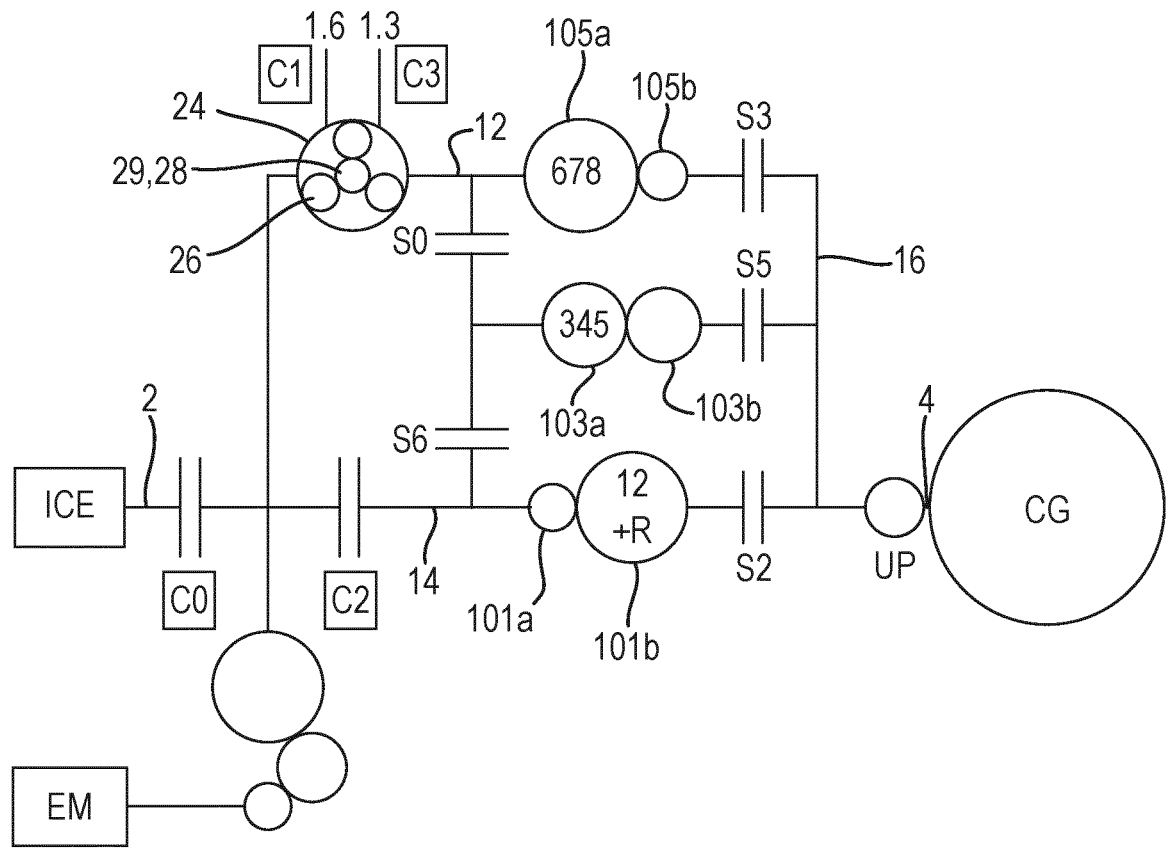
FIG. 8B shows a functional representation of the transmission system of FIG. 8A.

FIG. 8A shows a schematic representation of a transmission system 1. FIG. 8B shows a functional representation of the transmission system 1 of FIG. 8A. The transmission system 1 shown in FIG. 8A,8B differs from the transmission system as shown in FIG. 1A,1B in that the planetary gear set 22 includes a fourth rotational member 29. The fourth rotational member 29 is formed here by a second sun gear. In this example, the first rotational member 24 is connected to the input 2. The second rotational member 26 is connected to the first input shaft 12. The third rotational member 28 is connected to the first coupling member C1. The fourth rotational member is connected to a further coupling member C3. The first coupling member C1 comprises a friction brake, such as a wet or dry plate friction brake, which e.g. is normally open. The third coupling member C3 here is a friction brake, such as a wet or dry plate friction brake, which e.g. is normally open. The transmission system 1 of FIG. 8A,8B can be operated in eight gears, plus an optional reverse gear.

Here the first and second speed transforming gears 38, 40 are positioned axially between on the one hand the first and further coupling members C1, C3, and on the other hand the second coupling member C2. In this example, the second coupling member C2 is positioned axially between the rotational members and the first coupling member C1. It will be appreciated this is also possible in an embodiment wherein the planetary gear set 22 includes three rotational members and one friction element.

It will be appreciated that in examples shown in the foregoing Figures the planetary gear set can also be provided with at least four rotational members and a first a further coupling member C1, C3.

As shown in FIG. 8A,8B, the transmission includes a first/second transmission gear 101, a third/fourth/fifth transmission gear 103, and a sixth/seventh/eighth transmission gear 105.

The speed transforming gears may be selected such that the first/second transmission gear 101 forms the first gear if the third rotational member 28 of the planetary gear set 22 is braked, i.e. the first coupling member C1 is closed, and the third, fourth and fifth coupling members S0, S6, S2 are closed to couple the first input shaft 12 to the output shaft 16 via the first/second transmission gear 101.

The speed transforming gears may be selected such that the first/second transmission gear 101 forms the second gear if the second and the fifth coupling members C2, S2 are closed to couple the second input shaft 12 to the output shaft 16 via the first/second transmission gear 101. Here, an input gear wheel of the first/second transmission gear 101a is fixedly connected to the second input shaft 14, but an additional coupling member may be provided for selectively coupling the input gear wheel 101a to the second input shaft 14. Forming the second gear does not require idling of other transmission gears, such as the third/fourth/fifth and sixth/seventh/eighth transmission gears.

The speed transforming gears may be selected such that the third/fourth/fifth transmission gear 103 forms the third gear if the third rotational member 28 of the planetary gear set 22 is braked, i.e. the first coupling member C1 is closed, and the third and sixth coupling members S0, S5 are closed to couple the first input shaft 12 to the output shaft 16 via the third/fourth/fifth transmission gear 103.

The speed transforming gears may be selected such that the third/fourth/fifth transmission gear 103 forms the fourth gear if the second, fourth and the sixth coupling members C2, S6 and S5 are closed to couple the second input shaft 12 to the output shaft 16 via the third/fourth/fifth transmission gear 103.

The speed transforming gears may be selected such that the third/fourth/fifth transmission gear 103 forms the fifth gear if the fourth rotational member 29 of the planetary gear set 22 is braked, i.e. the further coupling member C3 is closed, and the third and sixth coupling members S0, S5 are closed to couple the first input shaft 12 to the output shaft 16 via the third/fourth/fifth transmission gear 103.

The speed transforming gears may be selected such that the sixth/seventh/eighth transmission gear 105 forms the sixth gear if the third rotational member 29 of the planetary gear set 22 is braked and the second and seventh coupling members C2, S3 are closed to couple the first input shaft 12 to the output shaft 16 via the fifth/sixth/seventh transmission gear 105.

The speed transforming gears may be selected such that the sixth/seventh/eighth transmission gear 105 forms the seventh gear if the second, fourth, third and seventh coupling members C2, S6 and S5 are closed to couple the second input shaft 12 to the output shaft 16 via the third/fourth/fifth transmission gear 105.

The speed transforming gears may be selected such that the sixth/seventh/eighth transmission gear 105 forms the eighth gear if the fourth rotational member 29 of the planetary gear set 22 is braked and the seventh coupling members S3 is closed to couple the first input shaft 12 to the output shaft 16 via the fifth/sixth/seventh transmission gear 105.

Figure 9A:
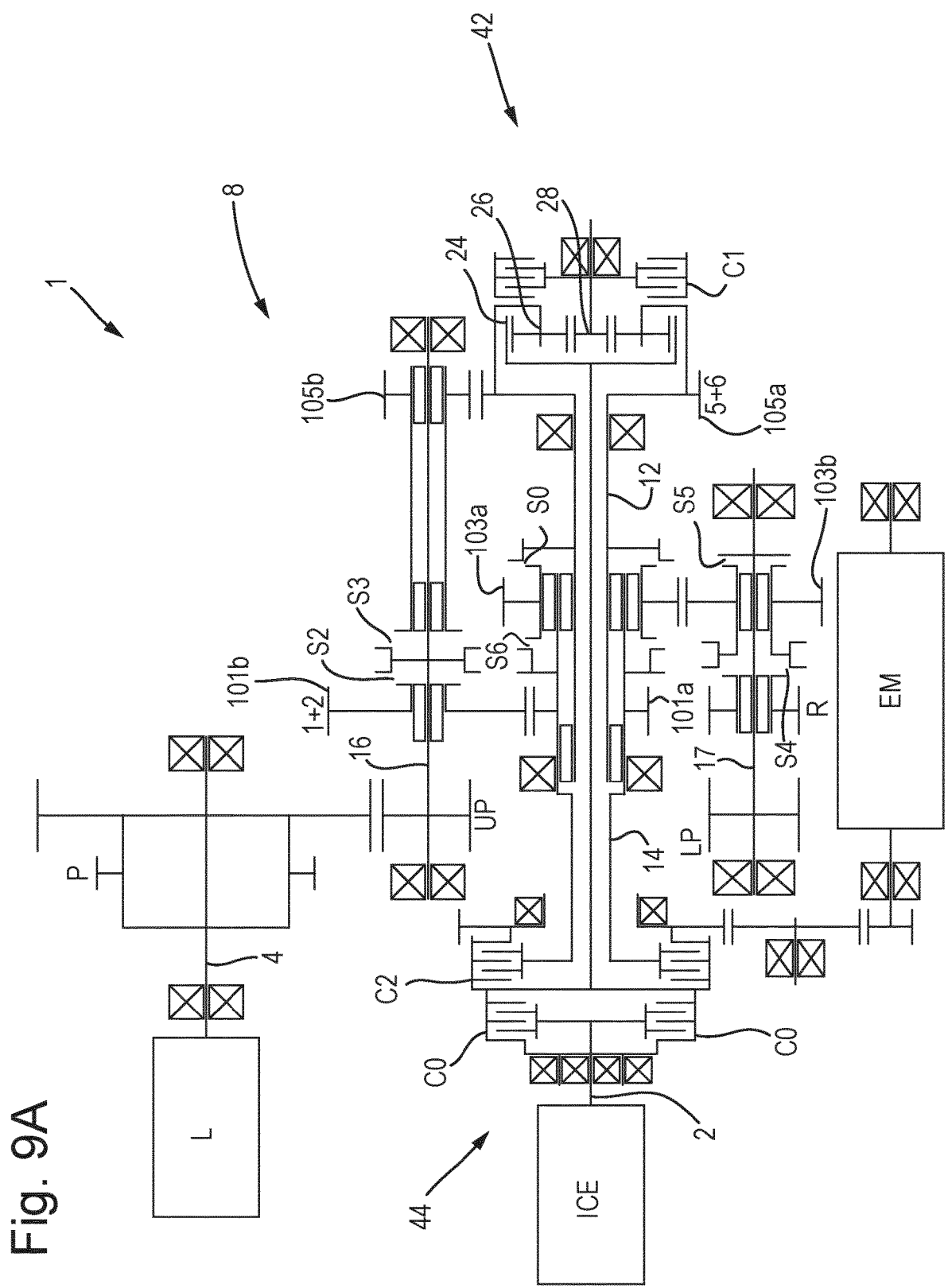
FIG. 9A shows a schematic representation of a transmission system.
Figure 9B:
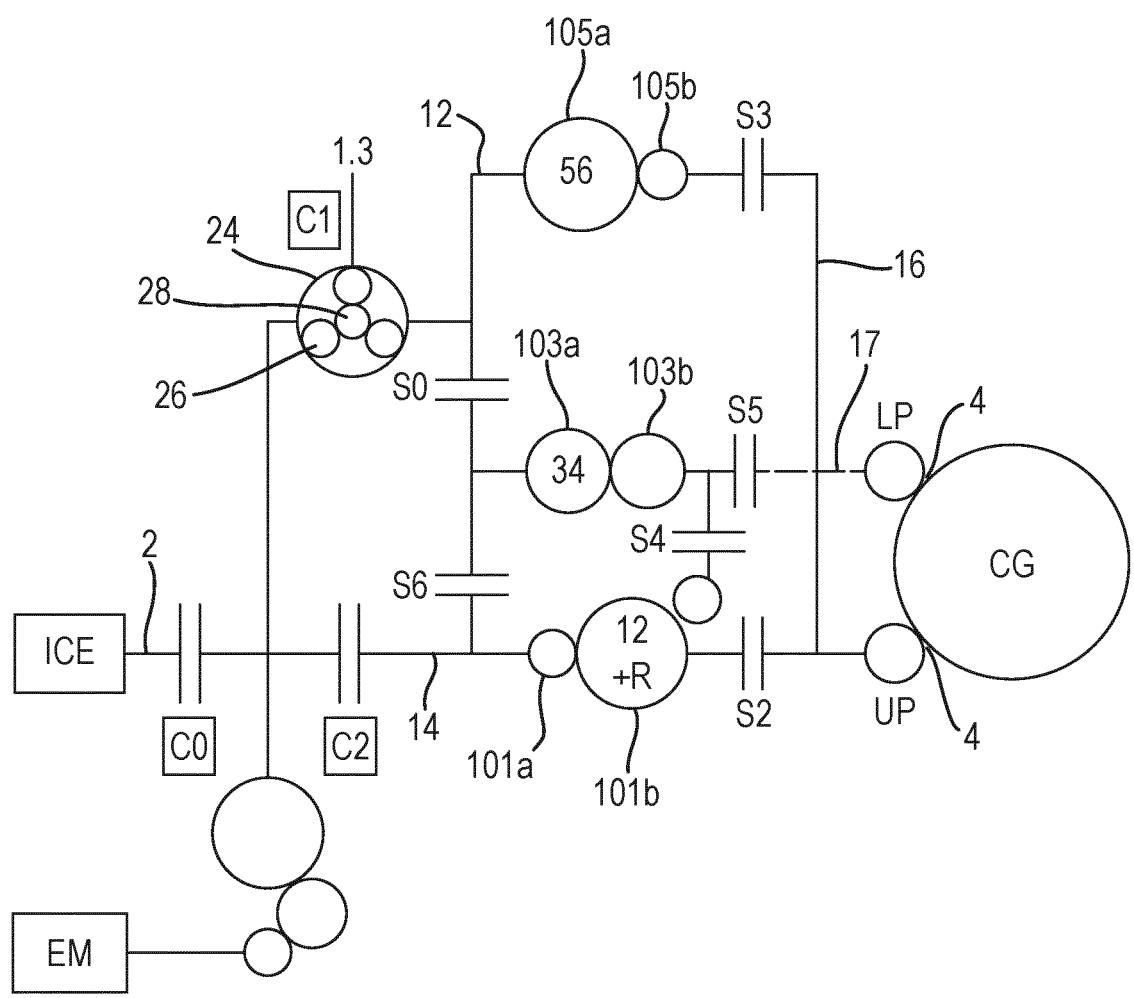
FIG. 9B shows a functional representation of a transmission system of FIG. 9A.

FIG. 9A shows a schematic representation of a transmission system 1. FIG. 9B shows a functional representation of a transmission system 1 of FIG. 9A. The transmission system 1 shown in FIG. 9A, 9B differs from the transmission system as shown in FIG. 1A, 1B in that the output gear wheel 103b of the third/fourth transmission gear 103 is provided on a further output shaft 17 separate from the first output shaft 16. Also provided on the further output shaft 17, is an intermediate gear wheel 53b which can be rotationally coupled to the output gear wheel 103b of the third/fourth transmission gear 103. The intermediate gear wheel 53b meshes with the output gear wheel 101b of the first/second transmission gear 101.

To operate the transmission 8 in reverse, the transmission includes a ninth coupling member S4, here including a ninth synchronizer. The ninth coupling member S4 has an seventeenth section S4a which is connected to the output gear wheel 103b of the third/fourth transmission gear 103 and a eighteenth section S4b which is connected to the intermediate gear wheel 53b.

The transmission is operated in reverse gear if the third rotational member 28 of the planetary gear set 22 is braked, i.e. the first coupling member C1 is closed, and the third, ninth, and the fifth coupling members S0, S4, S2 are closed.

A dedicated actuation means may be provided for actuating, e.g. engaging and disengaging, the ninth coupling member S4 independently from any other coupling member in the transmission system 1. This minimizes a shifting time between any forward gear and the reverse gear. It also provides for a modular build of the transmission system in which a reverse gear could be offered as an optional add-on feature. For example, in electrically driven vehicles the ninth coupling member S4 may be omitted as such vehicle can be driven in reverse by reversing the rotational direction of the electromotor. The ninth coupling member S4 may for example be hydraulically and/or electromechanically actuated.

The transmission system 1 further includes a sixth coupling member S5, here including a sixth synchronizer. The sixth coupling member S5 has an eleventh section S5a which is connected to the further output shaft 17 and a twelfth section S5b which is connected to a transmission gear of the transmission. In this example, the twelfth section S5b is connected to the third/fourth transmission gear 103. In particular, the twelfth section S5b is connected to an output gear wheel 103b of the third/fourth transmission gear 103. Here, the output gear wheel 103b of the third/fourth transmission gear is connected or connectable to the further output shaft 17.

Figure 10A:
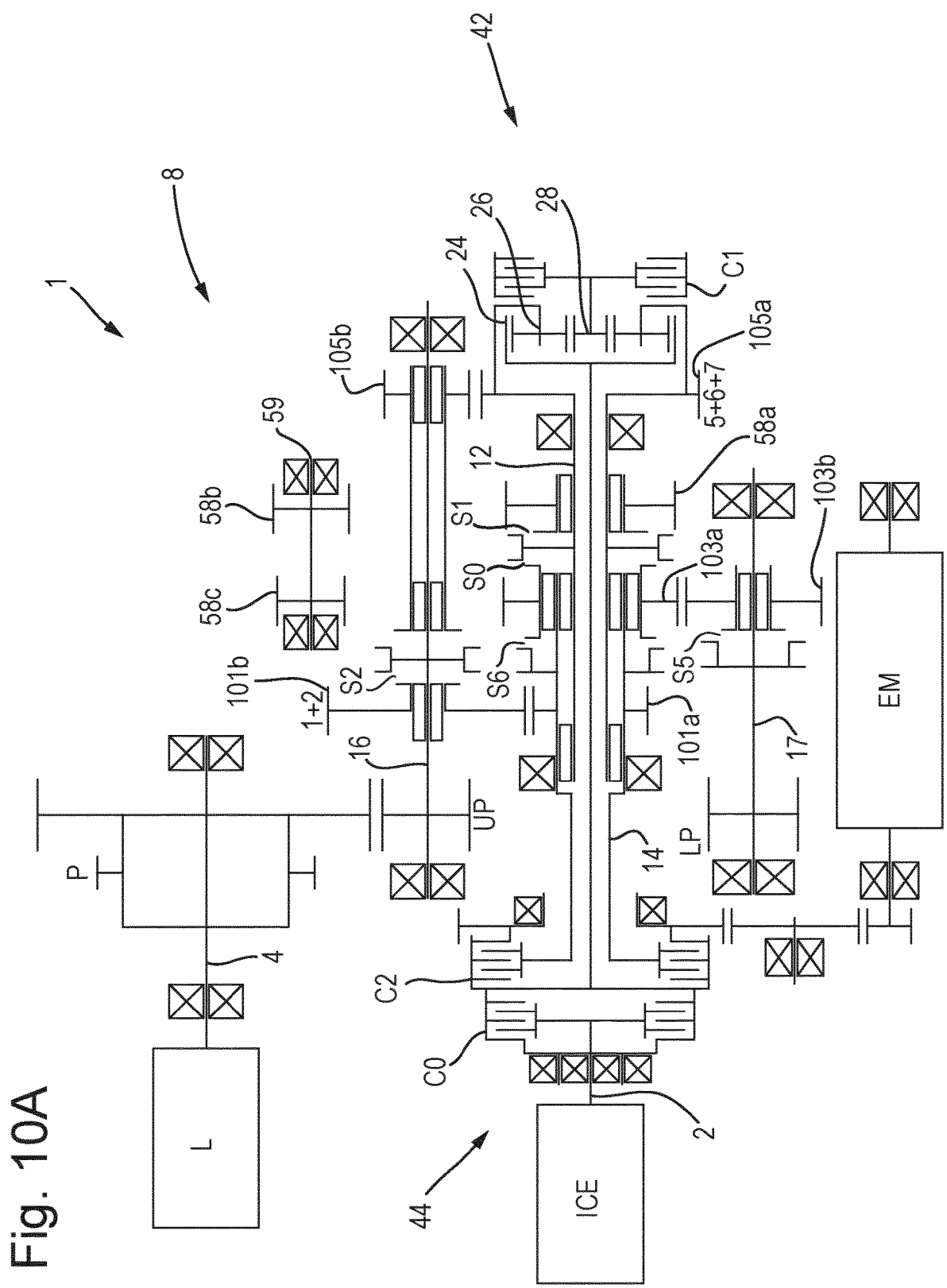
FIG. 10A shows a schematic representation of a transmission system.
Figure 10B:
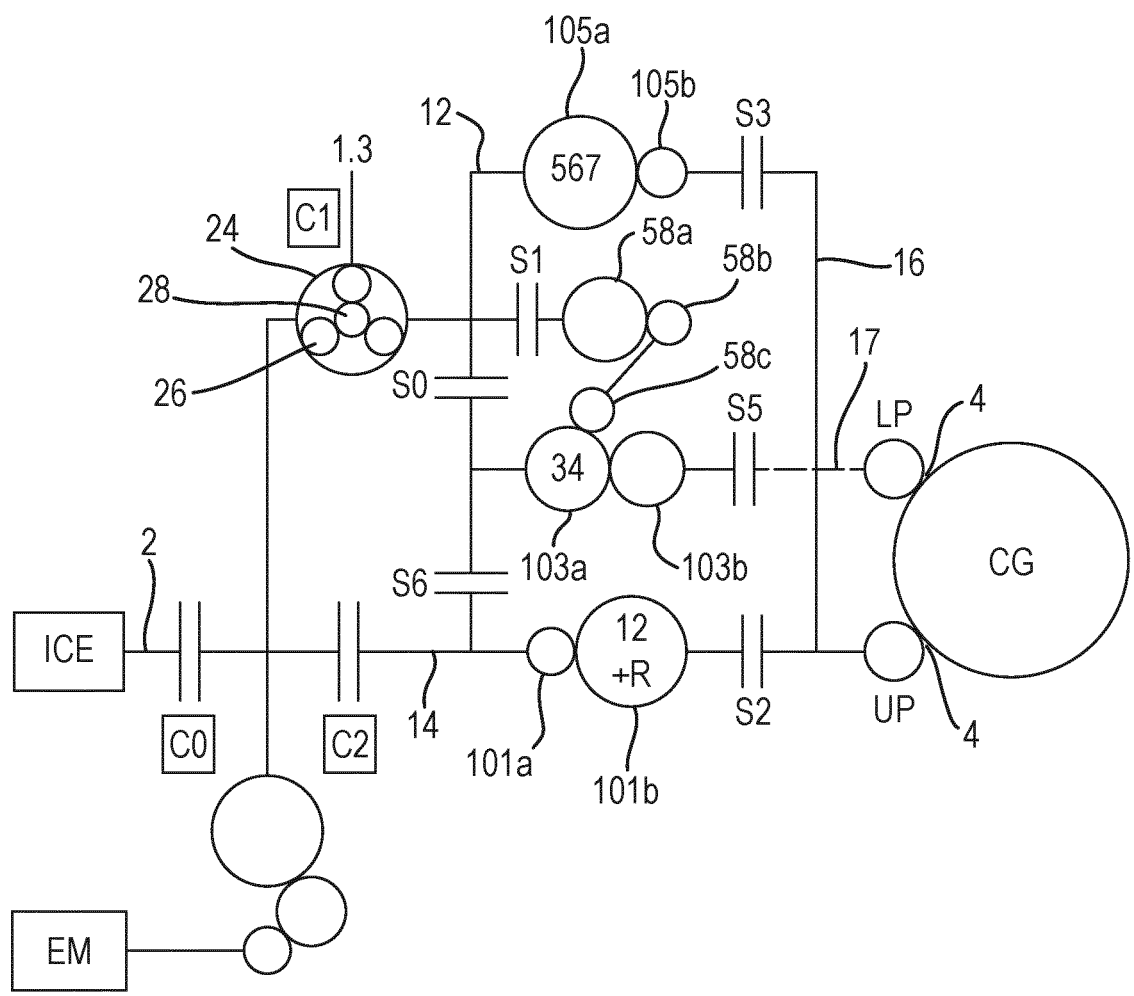
FIG. 10B shows a functional representation of a transmission system of FIG. 10A.

FIG. 10A shows a schematic representation of a transmission system 1. FIG. 10B shows a functional representation of the transmission system 1 of FIG. 10A. The transmission system 1 in FIG. 10A,10B differs from the transmission system as shown in FIG. 8A, 8B in that a linking gear 58 as shown in FIG. 3 is provided which linking gear 58 includes a separate linking shaft extending at least substantially parallel to the first input shaft 12. A reverse gear is omitted in FIG. 10. The transmission may be operated in reverse by e.g. reversing the rotational direction of the input, for example by reversing a rotational direction of the electromotor EM.

Figure 11B:
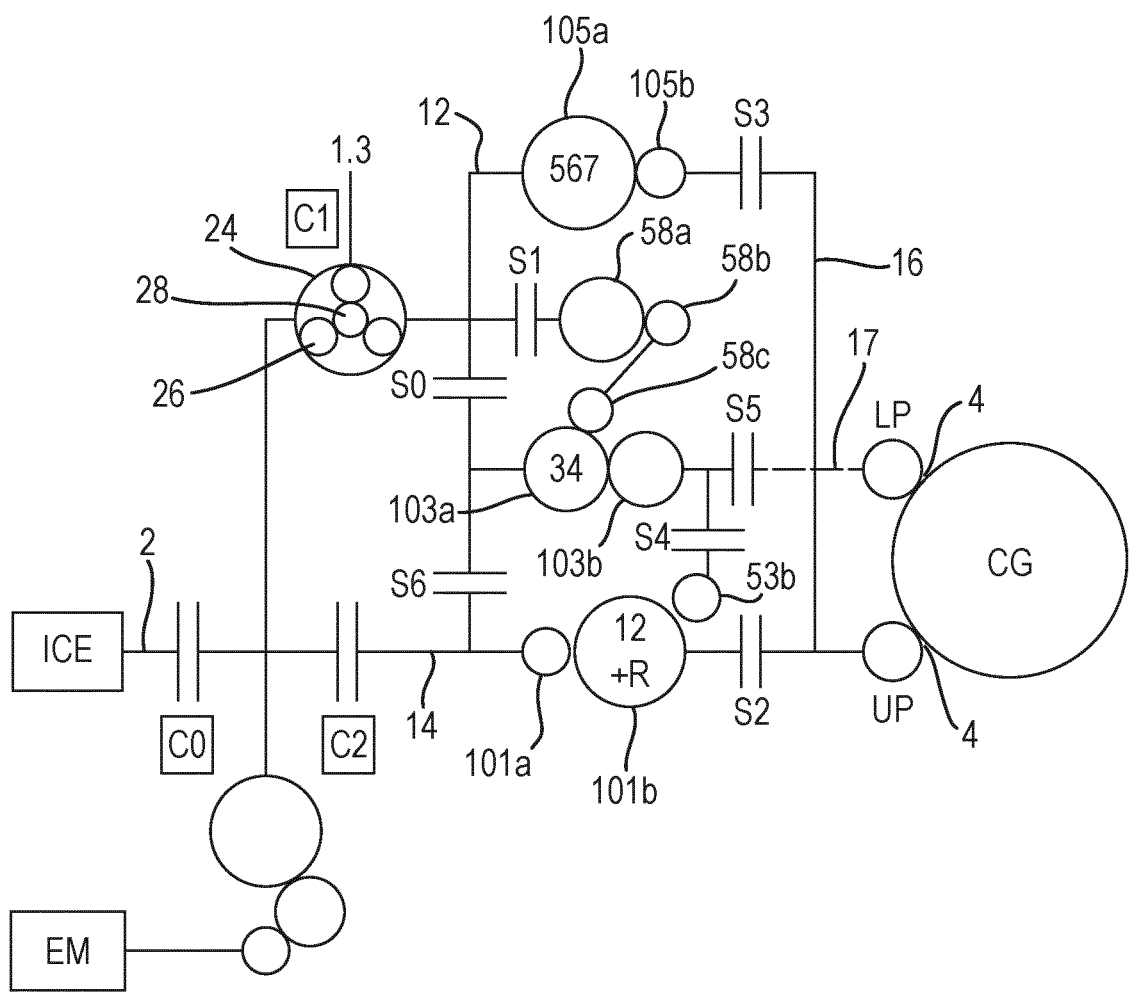
FIG. 11B shows a functional representation of a transmission system of FIG. 11A

FIG. 11A shows a schematic representation of a transmission system 1. FIG. 11B shows a functional representation of the transmission system 1 of FIG. 11A. The transmission system 1 shown in FIG. 11A, 11B differs from the transmission system as shown in FIG. 10A, 10B in that an intermediate gear wheel 53b is provided on the second output shaft 17, for operating the transmission in a reverse transmission gear. The intermediate gear wheel 53b can be rotationally coupled to the output gear wheel 103b of the third/fourth transmission gear 103. Here, the intermediate gear wheel 53b meshes with the output gear wheel 101b of the first/second transmission gear 101.

The transmission is operated in reverse gear if the third rotational member 28 of the planetary gear set 22 is braked, i.e. the first coupling member C1 is closed, and the third, ninth, and the fifth coupling members S0, S4, and S2 are closed.

Alternatively or additionally, the transmission is operated in reverse gear if the third rotational member 28 of the planetary gear set 22 is braked, i.e. the first coupling member C1 is closed, and the eighth, ninth, and the fifth coupling members S1, S4, and S2 are closed.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged.

The transmission system may be implemented in a vehicle, such as cars, recreational vehicles, trucks, buses, bicycles, motorcycles, lawn mowers, agricultural vehicles, construction vehicles, golf carts, trolleys and robotic vehicles. Other vehicles are possible as well. The shown embodiments involved vehicles comprising four wheels, however vehicles with a different number of wheels can be utilized. It also perceivable that a plurality of transmission systems are included in a vehicle.

Actuation of the coupling members may be performed by means of a hydraulic actuation system. However other embodiments may include actuation by means of mechanical, electromechanical or electro-hydraulic systems. A combination of actuation systems for the different components of the transmission are also envisaged.

The motor or engine of the vehicle comprising the transmission system according the current invention may be or include any combination of an internal combustion engine and an electric motor. Other motors and engines are possible as well such as a fuel-cell motor. In some embodiments, the motor is a hybrid engine and/or could include multiple types of engines and/or motors. For instance, a gas-electric hybrid car could include a gasoline engine and an electric motor. Other examples are possible.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A transmission system for a front wheel driven vehicle having an input arranged for connection to a drive source, and an output arranged for connection to a load, and comprising:
   a transmission comprising:
      an output shaft connected to the output,
      a first input shaft and a first speed transforming gear coupling the first input shaft to the output shaft, wherein the first speed transforming gear comprises at least a first transmission gear having a pair of gear wheels for transforming a rotational speed of the first input shaft into a lower, equal, or higher rotational speed at the output shaft, and
      a second input shaft and a second speed transforming gear coupling the second input shaft to the output shaft, wherein the second speed transforming gear comprises at least a second transmission gear having a pair of gear wheels for transforming a rotational speed of the second input shaft into a lower, equal, or higher rotational speed at the output shaft,
   a first coupling member including a first friction element, the first coupling member having a first section which is connected to the input, and a second section which is connected to the first input shaft of the transmission,
   a second coupling member including a second friction element, the second coupling member having a third section which is connected to the input, and a fourth section which is connected to the second input shaft of the transmission,
   a third transmission gear having a pair of gear wheels for transforming a rotational speed of either the first or the second input shaft into a lower, equal, or higher rotational speed at the output shaft,
   a third coupling member having a fifth section which is connected to the first input shaft and a sixth section which is directly connected to a first gear wheel of the pair of gear wheels of the third transmission gear, and
   a fourth coupling member having a seventh section which is connected to the second input shaft and an eighth section which is directly connected to said first gear wheel of the third transmission gear,
   wherein the first and/or second speed transforming gears are axially positioned between the first friction element and the second friction element.

2. The transmission system according to claim 1, wherein the transmission comprises only one output shaft.

3. The transmission system according to claim 1, wherein the first transmission gear is a fifth/sixth transmission gear for causing the transmission to operate in fifth or sixth gear, the second transmission gear is a first/second transmission gear for causing the transmission to operate in first or second gear, and the third transmission gear is a third/fourth transmission gear for causing the transmission to operate in the third or fourth gear.

4. The transmission system according to claim 1, wherein the first friction element is arranged at a first end of the transmission and/or the second friction element is arranged at a second, opposite, end of the transmission.

5. The transmission system according to claim 1, wherein the first speed transforming gear includes a reverse transmission gear.

6. The transmission system according to claim 1, wherein the transmission is free from a reverse transmission gear.

7. A transmission system for a front wheel driven vehicle having an input arranged for connection to a drive source, and an output arranged for connection to a load, and comprising:
   a transmission comprising:
      an output shaft connected to the output,
      a first input shaft and a first speed transforming gear coupling the first input shaft to the output shaft, and wherein the first speed transforming gear comprises at least a first transmission gear having a pair of gear wheels for transforming a rotational speed of the first input shaft into a lower, equal, or higher rotational speed at the output shaft, and
      a second input shaft and a second speed transforming gear coupling the second input shaft to the output shaft,
   wherein the second speed transforming gear comprises at least a second transmission gear having a pair of gear wheels for transforming a rotational speed of the second input shaft into a lower, equal, or higher rotational speed at the output shaft,
   a first coupling member including a first friction element, the first coupling member having a first section which is connected to the input, and a second section which is connected to the first input shaft of the transmission,
   a second coupling member including a second friction element, the second coupling member having a third section which is connected to the input, and a fourth section which is connected to the second input shaft of the transmission,
   a third transmission gear having a pair of gear wheels for transforming a rotational speed of either the first or the second input shaft into a lower, equal, or higher rotational speed at the output shaft,
   a third coupling member having a fifth section which is connected to the first input shaft and a sixth section which is directly connected to a first gear wheel of the pair of gear wheels of the third transmission gear,
   a fourth coupling member having a seventh section which is connected to the second input shaft and an eighth section which is directly connected to said first gear wheel of the third transmission gear;
   a linking gear including a first linking gear wheel and a second linking gear wheel, wherein the first linking gear wheel meshes with the second linking gear wheel, and wherein the second linking gear wheel is rotationally coupled to one of the gear wheels of the pair of gear wheels of the third transmission gear, and
   a further coupling member having one section connected to the first input shaft and another section connected to the first linking gear wheel of the linking gear.

8. The transmission system according to claim 7, wherein the second linking gear wheel and the second gear wheel of the third transmission gear are both mounted on a common linking shaft.

9. The transmission system according to claim 8, wherein a rotational axis of the linking shaft coincides with a rotational axis of the output shaft.

10. The transmission system according to claim 7, wherein the second linking gear wheel is rotationally coupled to a second gear wheel of the pair of gear wheels of the third transmission gear.

11. The transmission system according to claim 7, wherein the transmission comprises only one output shaft.

* * * * *